US010397434B2

(12) United States Patent
Momose

(10) Patent No.: US 10,397,434 B2
(45) Date of Patent: Aug. 27, 2019

(54) SCANNER THAT COMBINES IMAGES READ BY FIRST AND SECOND SENSOR ARRAYS, SCAN PROGRAM, AND METHOD OF PRODUCING SCAN DATA

(71) Applicant: SEIKO EPSON CORPORATION, Tokyo (JP)

(72) Inventor: Kiyoharu Momose, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/859,957

(22) Filed: Jan. 2, 2018

(65) Prior Publication Data

US 2018/0213107 A1  Jul. 26, 2018

(30) Foreign Application Priority Data

Jan. 23, 2017 (JP) ................................. 2017-009169

(51) Int. Cl.
| | | |
|---|---|---|
| H04N 1/407 | (2006.01) | |
| H04N 1/191 | (2006.01) | |
| H04N 1/19 | (2006.01) | |
| H04N 1/193 | (2006.01) | |
| H04N 1/401 | (2006.01) | |
| H04N 1/387 | (2006.01) | |
| H04N 1/409 | (2006.01) | |

(52) U.S. Cl.
CPC ........... *H04N 1/1912* (2013.01); *H04N 1/191* (2013.01); *H04N 1/1903* (2013.01); *H04N 1/1918* (2013.01); *H04N 1/1933* (2013.01); *H04N 1/3876* (2013.01); *H04N 1/401* (2013.01); *H04N 1/4092* (2013.01); *H04N 2201/0414* (2013.01)

(58) Field of Classification Search
None
See application file for complete search history.

(56) References Cited

U.S. PATENT DOCUMENTS

| 5,144,448 A * | 9/1992 | Hornbaker, III ....... H04N 1/193 |
| | | 348/262 |
| 5,838,837 A * | 11/1998 | Hirosawa .............. G06T 3/0081 |
| | | 382/284 |
| 6,348,981 B1 * | 2/2002 | Walsh .................... H04N 1/191 |
| | | 250/208.1 |
| 7,440,145 B2 * | 10/2008 | Kuwabara ............ H04N 1/1903 |
| | | 358/1.18 |

(Continued)

FOREIGN PATENT DOCUMENTS

| EP | 2091223 A1 | 8/2009 |
| JP | 4864021 B2 | 1/2012 |
| WO | 2016/163133 A1 | 10/2016 |

OTHER PUBLICATIONS

The Extended European Search Report for the corresponding European Patent Application No. 18153010.6 dated May 29, 2018.

*Primary Examiner* — Dung D Tran

(57) ABSTRACT

There is provided a scanner that combines images read by a first sensor array and a second sensor array, in which the first sensor array and the second sensor array have read regions which are overlapped partially, and includes a combining section that combines a first read image read by the first sensor array and a second read image read by the second sensor array and a correction section that corrects an image after a combining based on a degree of displacement of a reading position of the document.

7 Claims, 16 Drawing Sheets

(56) References Cited

U.S. PATENT DOCUMENTS

| | | | |
|---|---|---|---|
| 7,460,279 B2* | 12/2008 | Iwasaki | H04N 1/1903 |
| | | | 358/450 |
| 8,345,325 B2 | 1/2013 | Schmidt et al. | |
| 8,373,910 B2* | 2/2013 | Iwasaki | H04N 1/1215 |
| | | | 358/474 |
| 2004/0062454 A1* | 4/2004 | Komiya | G06T 5/50 |
| | | | 382/284 |
| 2006/0050951 A1 | 3/2006 | Iwasaki | |
| 2011/0026085 A1* | 2/2011 | Tsukahara | H04N 1/1903 |
| | | | 358/482 |
| 2016/0352957 A1* | 12/2016 | Aikawa | H04N 1/053 |
| 2017/0289395 A1* | 10/2017 | Ishiguro | H04N 1/4097 |
| 2018/0007232 A1* | 1/2018 | Yamagata | H04N 1/19 |

* cited by examiner

FIRST READ IMAGE

SECOND READ IMAGE

FIG. 22

SCANNER THAT COMBINES IMAGES READ BY FIRST AND SECOND SENSOR ARRAYS, SCAN PROGRAM, AND METHOD OF PRODUCING SCAN DATA

BACKGROUND

1. Technical Field

The present invention relates to a scanner, a scan program, and a method of producing scan data.

2. Related Art

In the related art, there is a known technique of scanning a document using a plurality of line sensors and combining an output detected by each line sensor to produce scan data. For example, in the techniques disclosed in Japanese Patent No. 4864021 and U.S. Pat. No. 8,345,325, light from a document read region reaches a plurality of line sensors through a predetermined optical path, whereby a document is scanned.

SUMMARY

An advantage of some aspects of the invention is to improve an image quality of scan data obtained by combining outputs of a plurality of line sensors.

According to an aspect of the invention, there is provided a scanner that combines images read by a first sensor array and a second sensor array, in which the first sensor array and the second sensor array have read regions which are overlapped partially, and includes a combining section that combines a first read image read by the first sensor array and a second read image read by the second sensor array, an acquisition section that acquires a degree of relative deviation between the first read image and the second read image in a main scanning direction in a region read by the first sensor array and the second sensor array in an overlapped manner, and a correction section that corrects an image after a combining based on the degree. In this configuration, it is possible to correct deterioration of the image quality caused by displacement of a reading position of the document by the correction section. Accordingly, it is possible to improve the image quality of scan data obtained by combining outputs of a plurality of line sensors.

In the scanner that combines the images read by the first sensor array and the second sensor array, the first sensor array and the second sensor array may have read regions which are overlapped partially, and the scanner may include the combining section that combines a first read image read by the first sensor array and a second read image read by the second sensor array, the acquisition section that acquires a degree of the displacement of the reading position of the document, and the correction section that corrects an image after a combining based on the degree. In this configuration, it is possible to correct the deterioration of the image quality caused by displacement of the reading position by the correction section. Accordingly, it is possible to improve the image quality of the scan data obtained by combining the outputs of the plurality of line sensors.

In the scanner, the correction section may correct at least any one of brightness or sharpness of an image after a combining based on the degree of the deviation and the displacement. In this configuration, it is possible to eliminate or reduce the variation of the brightness and the decrease of the sharpness caused by the displacement of the reading position of the document.

In the scanner, the correction section may make the brightness in a case where the degree of the deviation and the displacement is large brighter than in a case where the degree is small. In this configuration, it is possible to correct the brightness with a correction amount according to a change in the degree of the deviation and the displacement.

In the scanner, the correction section may make the sharpness in a case where the degree of the deviation and the displacement is large higher than in a case where the degree is small. In this configuration, it is possible to correct the sharpness with a correction amount according to a change in the degree of the deviation and the displacement.

In the scanner, the correction section may determine a correction target region based on a distribution of the degree of the deviation and the displacement. In this configuration, it is possible to perform the correction for a region wider than a local portion where the deviation and the displacement are observed.

In the scanner, a plurality of overlap regions may exist in the main scanning direction, and the distribution of the degree of the deviation and the displacement may be a distribution of the degree in the plurality of overlap regions. In this configuration, it is possible to analyze characteristics of a wide range of the deviation and the displacement.

In the scanner, the correction section may correct an image inside the correction target region based on an image outside the correction target region. In this configuration, it is possible to correct deterioration of the image quality occurring in the correction target region based on the image outside the correction target region estimated to have no deterioration in the image quality.

In the scanner, the correction section may perform the same type of correction with respect to an image in an overlap region and an image in a region continuous to the overlap region. In this configuration, it is possible to perform the same type of correction in a region estimated to have equivalent deterioration of the image quality.

BRIEF DESCRIPTION OF THE DRAWINGS

The invention will be described with reference to the accompanying drawings, wherein like numbers reference like elements.

FIG. 22 is a diagram showing an example of the document.

DESCRIPTION OF EXEMPLARY EMBODIMENTS

Here, embodiments of the invention will be described in the following order.
(1) Configuration of Scanner
(2) Combination of Output
(3) Scan Processing
(4) Deviation Amount Calculation Processing
(5) Deformation Processing
(6) Correction Processing
(7) Example
(8) Another Embodiment

(1) Configuration of Scanner

Figure 1:
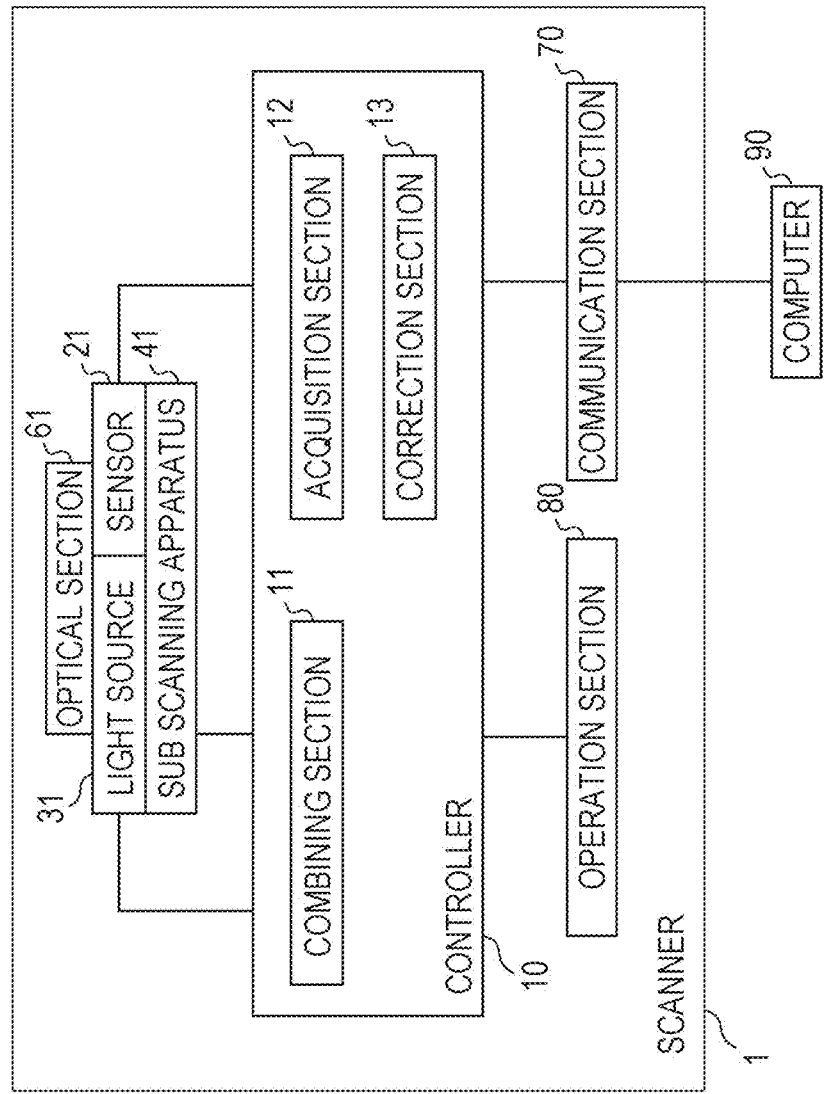
FIG. 1 is a block diagram of a scanner.

FIG. 1 is a block diagram of a scanner 1 according to an embodiment of the invention. The scanner 1 includes a controller 10, a communication section 70, an operation section 80, and a read section (light source 31, sensor 21, sub scanning apparatus 41, and optical section 61). The controller 10 includes a recording medium (not shown) and a processor (may be a dedicated circuit such as an ASIC in which a circuit is configured so as to execute specific processing, the ASIC or the like and a CPU that cooperate with each other, or the CPU) that reads a program from the recording medium and executes the program.

The controller 10 includes a combining section 11, an acquisition section 12, and a correction section 13, controls each section of the scanner 1, reads a document by processing of the combining section 11, corrects reading results by processing of the acquisition section 12 and the correction section 13, and generates scan data. The operation section 80 includes an output section for providing various pieces of information to a user and an input section for accepting an input operation by the user. The controller 10 controls the operation section 80 to display information for selecting a read condition, instructing a scan start, or the like on the output section. It is possible for the user to input the selection of the read condition, the instruction of the scan start, or the like based on an output of the output section.

When the instruction of the scan start is input, the combining section 11 controls each section of the scanner 1 to cause an operation (for example, transportation of document) for reading the document. With the operation, when the reading results are output from a line sensor, the combining section 11 combines the reading results, and the acquisition section 12 and the correction section 13 correct the reading results to generate scan data.

The communication section 70 is an apparatus for communicating with an external apparatus (external computer 90 in the embodiment), and the controller 10 transmits arbitrary information to the computer 90 and can receive various instructions or the like from the computer 90. In the embodiment, when the correction section 13 of the controller 10 generates the scan data, the correction section 13 transmits the scan data to the computer 90 through the communication section 70. Needless to say, the scan data may be used in various modes, may be stored in the recording medium (not shown) included in the scanner 1, may be stored in a portable recording medium, and may be provided to an apparatus other than the computer 90 through the communication section 70.

The scanner 1 according to the embodiment includes a document platen, and a document placed on the flat document platen is read. Accordingly, in the embodiment, the document is read usually at a position of the upper surface of the document platen (surface on which document is placed). In the embodiment, the upper surface of the document platen is referred to as a reference reading position. The document on the document platen is read by the read section including a sensor 21, a light source 31, a sub scanning apparatus 41, and an optical section 61.

Figure 2:
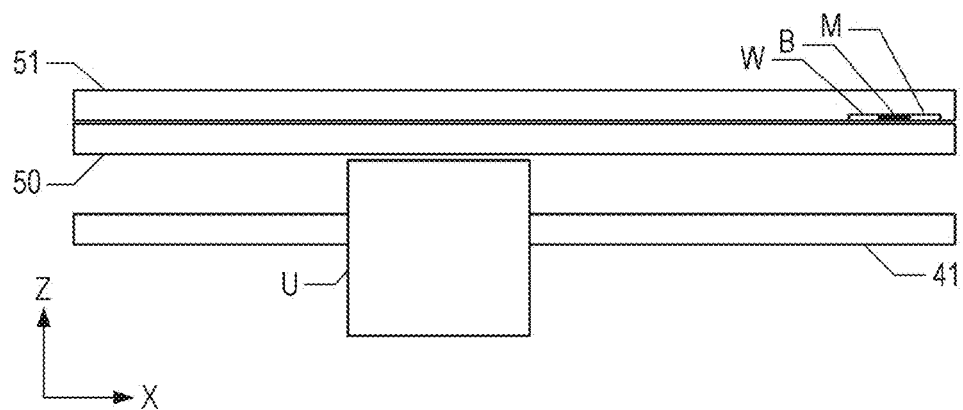
FIG. 2 is a diagram showing a peripheral structure of a sub scanning apparatus of the scanner.

FIG. 2 is a diagram schematically showing a document platen 50, a read section U, and a cover 51. In the figure, the X-axis indicates a sub scanning direction, the Z-axis indicates a direction perpendicular to the document platen 50, and a direction perpendicular to the X-axis and the Z-axis is a main scanning direction. The cover 51 which can be opened and closed by a hinge is attached to the scanner 1. When the cover 51 is closed in a state where there is no document on the document platen 50, a white reference plate W, a black reference plate B, and a combining mark plate M provided on the back surface of the cover 51 come into contact with the document platen 50. Accordingly, when the cover 51 is closed in the state where there is no document on the document platen, it is possible to read the white reference plate W, the black reference plate B, and the combining mark plate M.

The white reference plate W, the black reference plate B, and the combining mark plate M can be disposed at arbitrary positions within a reading range. In the embodiment, the white reference plate W, the black reference plate B, and the combining mark plate M are disposed at positions not overlapped with the document. That is, in the embodiment, it is configured such that the document is disposed aligned at one end (X-axis negative direction) of the document platen 50, and when the cover 51 is closed with the document on the document platen 50, it is disposed at such a position that the document does not come into contact with the white reference plate W, the black reference plate B, and the combining mark plate M. For this reason, it is possible to read the white reference plate W, the black reference plate B, and the combining mark plate M as necessary before the reading of the document.

The white reference plate W, the black reference plate B, and the combining mark plate M are members long in the main scanning direction and exist at least over the entire reading range in the main scanning direction. The combining mark plate M is a member in which combining mark is formed in each of overlap regions (details will be described below) read by a plurality of line sensors in an overlapped manner. The combining mark is a mark for specifying a binding position which is the reference for combining read image read by each line sensor. When each line sensor read the combining mark in a state where the cover 51 is closed, it is configured such that a binding is performed by overlapping pixels of elements that read the combining mark. The white reference plate W is a white member which is a reference for white, and a surface in contact with the document platen 50 is a white reference surface which is a white reference. The black reference plate B is a black member which is a reference for black, and a surface in contact with the document platen 50 is a black reference surface which is a black reference.

The sub scanning apparatus 41 is an apparatus capable of reciprocating the read section U in the sub scanning direction (X-axis direction). The controller 10 can control an operation of the sub scanning apparatus 41 by the processing of the combining section 11.

The light source 31 includes an LED attached to the sub scanning apparatus 41 so as to irradiate illumination light toward a predetermined direction of the document platen. Accordingly, in a case where the document is read, the light source 31 can move in the sub scanning direction in a state where an orientation of the LED faces a fixed direction. That is, a position irradiated by the illumination light moves in the sub scanning direction to change a reading position, and a sub scanning is performed. The light source 31 may include the LED having one color or may include the LEDs having a plurality of colors. That is, in a case where color scan is performed, reading of each color may be performed in a state where one color of the LEDs having the plurality of colors (typically three colors) is turned on and other colors are turned off. In the case, processing of the combining or the like described later may be performed for each color or a calculation may be performed for the combining based on a representative color component (for example, image having brightness calculated from arbitrary one color or the plurality of colors of LEDs) and the combining of each color may be performed based on the calculation result.

The optical section 61 includes an optical member that forms an image of the document while reducing the image in the sensor 21. That is, the optical section 61 includes the optical member that forms an optical path for guiding light from the document generated by irradiating the document with light from the light source 31 is guided to the line sensor. The optical path may be provided by various structures, and the optical member can be configured by any of various members such as a diaphragm, a lens, or reflection mirror or a combination thereof.

Figure 3:
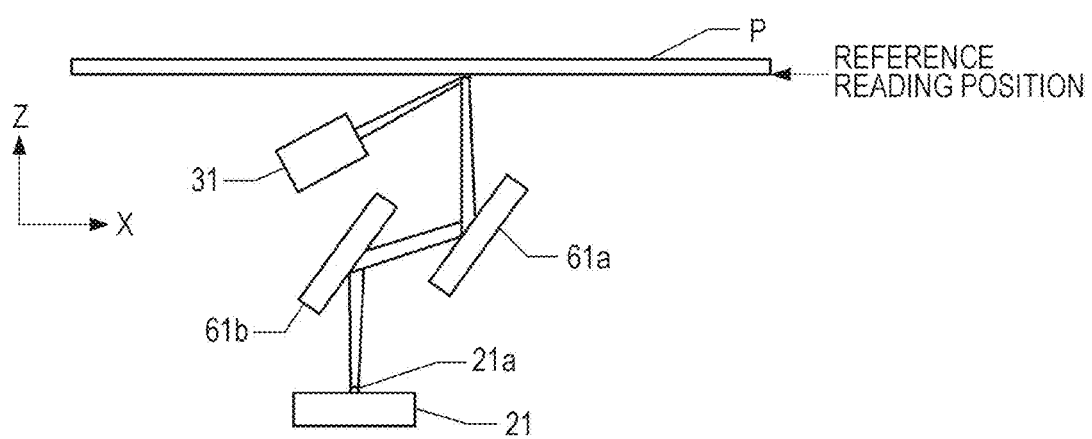
FIG. 3 is a diagram showing a configuration example of an optical section of the scanner.

FIG. 3 is a diagram showing an example of the optical path and shows a state where the line of sight is parallel to the main scanning direction. FIG. 3 shows the light source 31 for irradiating a document P placed on the document platen 50 with light, the optical section 61 (61a and 61b), and the sensor 21. The optical section 61 includes two reflection mirrors 61a and 61b, and, for example, when the reflection mirror 61a is a plane mirror and the reflection mirror 61b is a concave mirror, it is possible to employ a configuration of guiding light of one line in the main scanning direction (direction perpendicular to the X-axis and the Z-axis) of the document P to a line sensor 21a by dividing and reducing the light in the main scanning direction or the like.

Light reflected by an object (for example, document or white reference plate) existing at the reference reading position is received by a plurality of line sensors 21a included in the sensor 21. Each the line sensor 21a is a sensor extending in one direction and is a sensor in which a plurality of photoelectric conversion elements (hereinafter, referred to as elements) are arranged in the one direction. Each line sensor 21a is arranged in the main scanning direction such that a direction in which the elements are aligned becomes a linear form.

The sensor 21 includes an analog front-end (not shown). The analog front-end includes a circuit that acts a gain on a signal output from the element according to an amount of received light and outputs the signal, and a circuit that performs an A/D conversion. In the embodiment, the analog front-end includes a recording medium that records information indicating the gain, and in the analog front-end, a gain adjustment is performed to set a black level of the sensor 21 to a minimum output value and a white level to a maximum output value based on the information indicating the gain.

Figure 4:
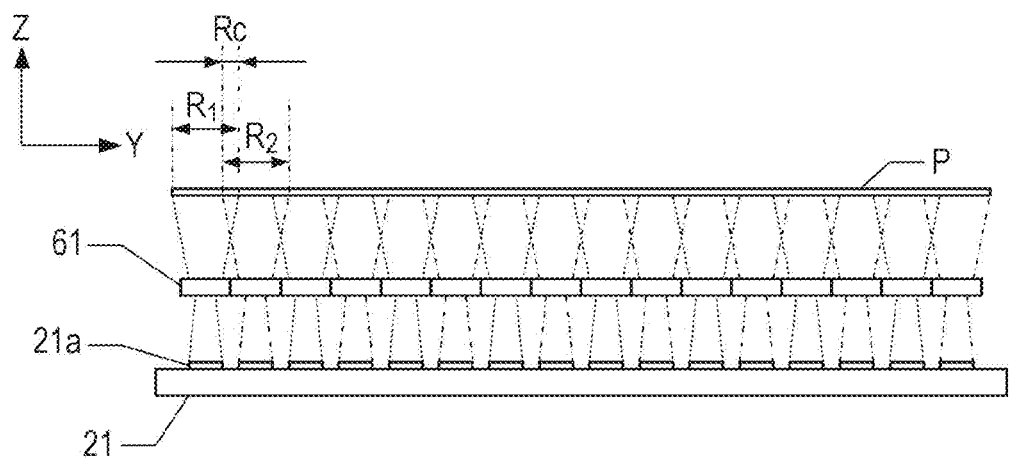
FIG. 4 is a diagram schematically showing a reduction by the optical section.

FIG. 4 schematically shows an action by the optical section 61 in a state where the line of sight is parallel to the sub scanning direction. In FIG. 4, it is shown that light from the document P is guided to the line sensor 21a through the optical section 61, and an optical path of the light from the document P is shown schematically by a broken line and a dashed-dotted line. That is, the line sensors 21a are arranged in the main scanning direction (Y-axis direction), and an image for each part which is overlapped partially and is adjacent to each other in the main scanning direction on the document P is reduced in each part of the optical section 61 corresponding to each part of the document P. The image in each part of the document P is formed in each line sensor 21a corresponding to each part. In FIG. 4, the broken line and the dashed-dotted line schematically show a range of the optical path, and the image can be reversed in the Y direction by optical section 61.

As described above, in each line sensor 21a included in the sensor 21 in the embodiment, it is configured such that adjacent each line sensor 21a read each part adjacent in the main scanning direction on the document P and the adjacent line sensor 21a reads an overlap region which is the same region on the document P in an overlapped manner in a part of the sensor. Accordingly, in a case where a region on the document read by one adjacent line sensor 21a is a first region, a region on the document read by the other adjacent line sensor 21a is a second region. A region in which the first region and the second region are overlapped is the overlap region. In FIG. 4, one example of a first region R1, a second region R2, and an overlap region Rc is shown. However, when 16 line sensors 21a exist as shown in FIG. 4, 15 overlap regions exist, and when 18 line sensors 21a exist, 17 overlap regions exist.

(2) Combining of Output

In each line sensor 21a, since the overlap region of the document P is read in an overlapped manner, the combining section 11 of the controller 10 combines data output by the adjacent line sensor 21a. Specifically, the combining section 11 mixes the outputs of the plurality of line sensors 21a based on the combining mark formed on the combining mark plate M. For this purpose, in the embodiment, the reading of the combining mark is performed before the reading of the document P.

Figure 5:
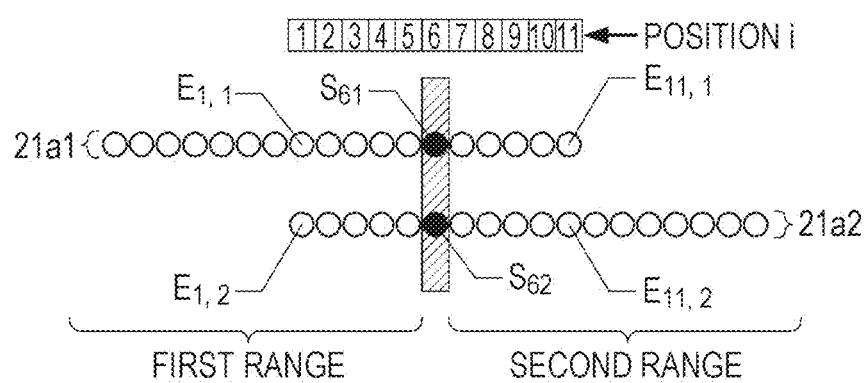
FIG. 5 is a diagram showing a combining of reading results.

Specifically, the combining section 11 controls the sub scanning apparatus 41 to move the read section to a position where the combining mark can be read. In the state, the combining section 11 turns on the light source 31. As a result, each line sensor 21a outputs an image that reads the combining mark. FIG. 5 is a schematic diagram showing the elements included in the line sensor 21a, and the elements are indicated by circles. In an example shown in FIG. 5, the combining mark is a straight line extending in the sub scanning direction, and a part other than the combining mark on a combining mark surface is white.

The combining mark is read by both adjacent line sensors 21a. In FIG. 5, the elements of the line sensors 21a that read the combining mark formed at the same position of the combining mark plate M are colored in black and are shown schematically, and the combining mark is shown schematically by hatching and is overlapped on the elements that read the combining mark. The schematic diagram of the line sensor 21a is disposed such that the elements that read the combining mark are arranged in the vertical direction by disposing one adjacent line sensor 21a on the upper left side and disposing the other line sensor on the lower right side. Here, the one adjacent line sensor 21a is referred to as a first line sensor 21a1, and the other line sensor is referred to as a second line sensor 21a2.

The first line sensor 21a1 and the second line sensor 21a2 output an output according to the amount of received light of each element arranged in the main scanning direction as serial data. The combining section 11 analyzes an output of the first line sensor 21a1 to specify that the sixth element $S_{61}$ from the end portion detects the combining mark. The combining section 11 analyzes an output of the second line sensor 21a2 to specify that the sixth element $S_{62}$ from the end portion detects the combining mark. In the case, the combining section 11 records a position of each element in association with each line sensor 21a in a memory (not shown) by assuming that the sixth element $S_{61}$ from the end portion of the first line sensor 21a1 and the sixth element $S_{62}$ from the end portion of the second line sensor 21a2 read the same position. Here, a position of elements that read the same position is referred to as the binding position.

The combining section 11 sequentially performs the above processing from a line sensor 21a located at the end in the main scanning direction to specify the binding position of each of the plurality of line sensors 21a. With the specified binding position as described above, when the document P is read, the combining section 11 mixes the output of each line sensor 21a based on the position to generate data of one line. In the embodiment, the mixing is performed by adding a value obtained by weighting the output of the adjacent line sensor 21a.

That is, when a first read image generated from the output of the first line sensor 21a1 and a second read image generated from the output of the second line sensor 21a2 are combined, if one pixel of a first range is generated by only the first read image and the other pixel of a second range is generated by only the second read image with the binding position as the boundary, the image quality is deteriorated. For example, the image is viewed discontinuously with the binding position which is the seam as the boundary, so that the image quality may be deteriorated such as the seam being recognized. In the embodiment, the combining is performed from the first range toward the second range by gradually changing the weight of the first read image from a large value to a small value and by gradually changing the weight of the second read image from a small value to a large value. Specifically, positions of pixels of the first read image and the second read image are expressed as $E_{i,1}$ and $E_{i,2}$ at position i (i is an integer of 1 or more) from the end of one line sensor, and pixels at the binding position of each line sensor are expressed as the same position number (i=6 in the example shown in FIG. 5). For example, a position of the end of the second line sensor 21a2 shown in FIG. 5 is i=1, and a position of the end of the first line sensor 21a1 is i=11.

In the case, a value of an image after the combining at the position i is $a_i E_{i,1} = b i E_{i,2}$. Also, $a_i$ and $b_i$ are weighting values, $1 = a_i + b_i$. In the example, as has an initial value of 1 and decreases to zero with increasing i, and $b_i$ has an initial value of zero and increases to 1 with increasing i. Further, in the embodiment, weights $a_6$ and $b_6$ at the binding position i=6 are set to be equal. That is, the mixing ratio at the binding position is 50%, the weighting of the second read image becomes large in the second range on the second line sensor 21a2 side than the binding position, and the weighting of the first read image becomes large in the first range on the first line sensor 21a1 side than the binding position.

According to the configuration in which the combining is performed by the mixing as described above, it is possible to perform the combining such that the seam is inconspicuous. The weighting value may be changed gradually from the first range toward the second range, may be changed continuously, or step by step. The weighting may be changed linearly or curvilinearly along the main scanning direction.

Figure 6:
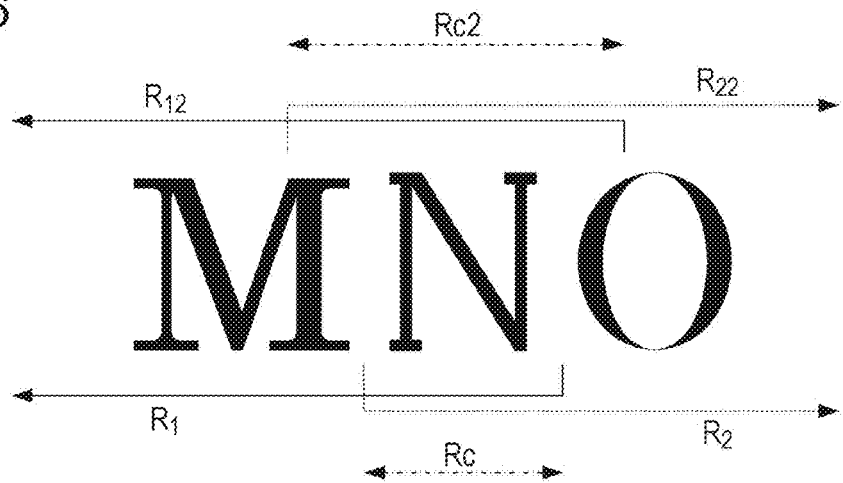
FIG. 6 is an explanatory diagram of an overlap region.
Figure 7:
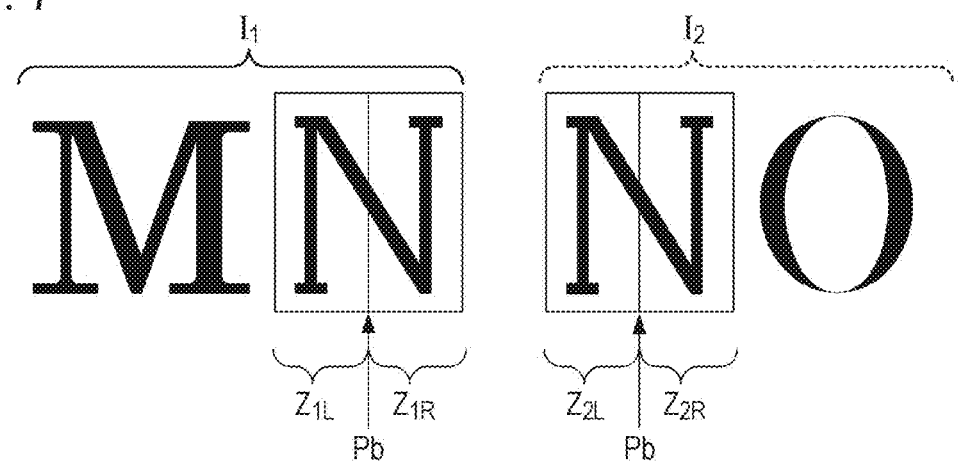
FIG. 7 is an explanatory diagram of a first read image and a second read image.
Figure 8:
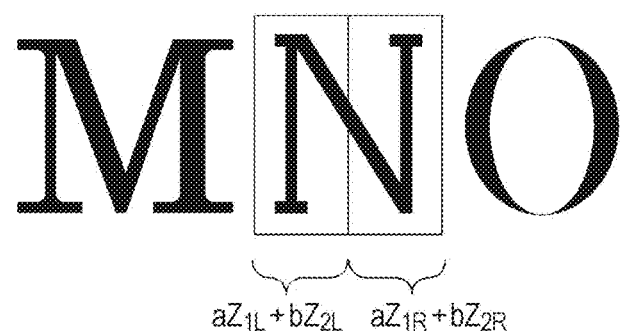
FIG. 8 is an explanatory diagram of a mix.

In the scanner 1, the sub scanning apparatus 41 moves the sensor 21 or the like in the sub scanning direction to perform the sub scanning. As a result, it is possible to scan the document two-dimensionally. FIGS. 6 to 8 are explanatory diagrams for two-dimensionally describing the combining performed based on the output of the adjacent line sensor 21a. FIG. 6 shows a character example "MNO" on a document read by certain first line sensor 21a1 and second line sensor 21a2. The example shows that "MN" is written in the first region $R_1$, and "NO" is written in the second region $R_2$. In the example, "N" is written in the overlap region Rc.

FIG. 7 shows an example of a first read image $I_1$ and a second read image $I_2$ in a case where the first line sensor 21a1 and the second line sensor 21a2 read the document shown in FIG. 6. As shown in the figure, the character in the overlap region Rc is read by both the first line sensor 21a1 and the second line sensor 21a2, and the characters outside the overlap region Rc are read by either the first line sensor 21a1 or the second line sensor 21a2.

In FIG. 7, a binding position Pb of the first read image $I_1$ and the second read image $I_2$ is indicated by an arrow. In the example shown in FIG. 7, since the center of the character "N" is the binding position Pb, left and right images of the binding position Pb are mixed to be combined. That is, an image in a region $Z_{1L}$ and an image in a region $Z_{2L}$ shown in FIG. 7 are mixed by the weighting which is changed for each position. An image in a region $Z_{1R}$ and an image in a region $Z_{2R}$ shown in FIG. 7 are mixed by the weighting which is changed for each position.

FIG. 8 is a diagram showing an image after the combining by the mixing. In FIG. 8, "$aZ_{1L}+bZ_{2L}$" indicates that the half of the left side of the character "N" is a weighted addition of the image in the region $Z_{1L}$ and the image in the region $Z_{2L}$, and "$aZ_{R1}+bZ_{2R}$" indicates that the half of the right side of the character "N" is the weighted addition of the image in the region $Z_{1R}$ and the image in the region $Z_{2R}$.

According to the configuration described above, in a case where a reading surface of the document is in contact with the upper surface of the document platen 50 and the reading surface of the document exists at the reference reading position, it is possible to appropriately generate the image of one line in the main scanning direction by the plurality of line sensors and appropriately generate the sub scanned two-dimensional image. However, a user of the scanner 1 according to the embodiment can cause the reading of the document in various modes, and the reading may be performed in a state where the document is displaced from the reference reading position. For example, in a case where the reading of a book bound by a spine cover is performed, since a state where all the documents near a bound portion are in contact with the document platen 50 cannot be realized, the reading may be performed in a state where at least a part of the document is floated.

In the scanner 1, since the light from the document is guided to the line sensor 21a through the optical section 61, when the reading is performed in the state where the document is displaced from the reference reading position, the reading results of the same document are different due to the variation of the optical path of the light reaching the line sensor 21a as compared with a state where the document is not displaced from the reference reading position. Specifically, in the embodiment, when the document position is displaced from the reference reading position and the floating occurs, an optical path length in a case of performing the reading in the state becomes longer than a reference optical path length.

Figure 9:
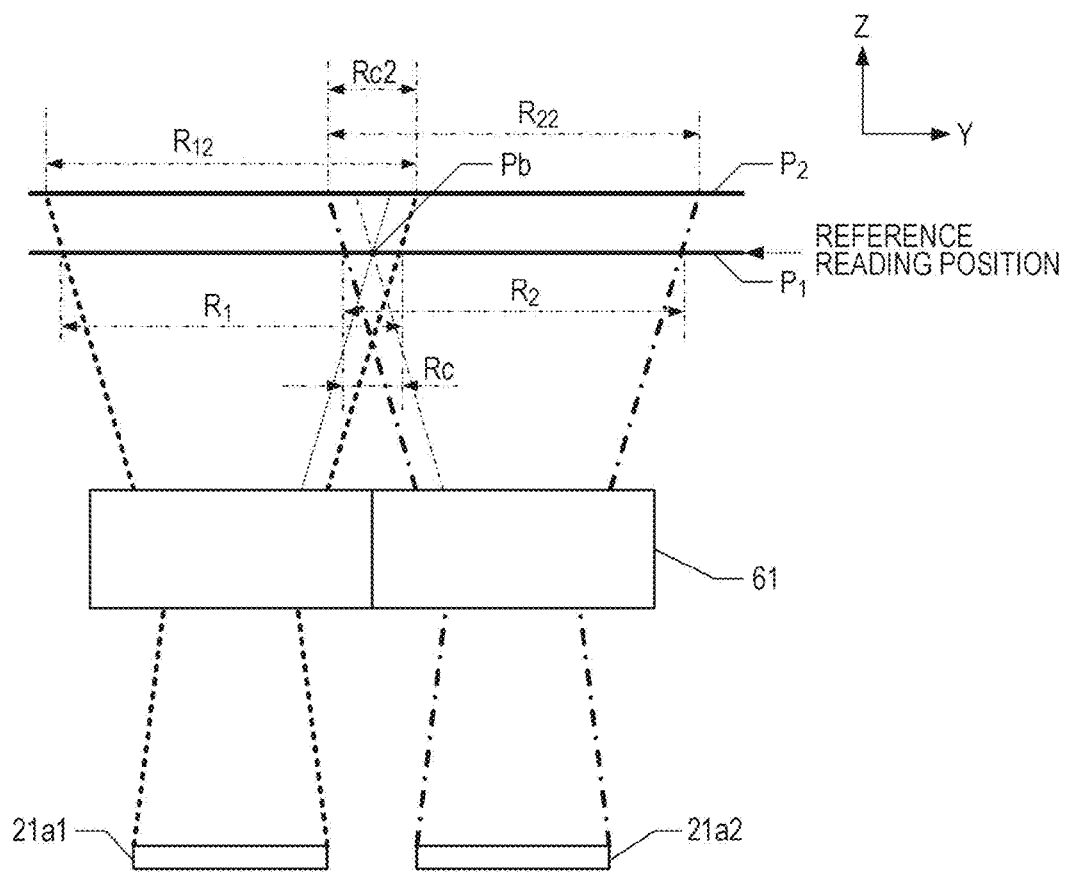
FIG. 9 is an explanatory diagram for describing an influence of displacement of a document.

FIG. 9 is an enlarged diagram showing a part extracted from the optical section 61 and the document shown in FIG. 4. In FIG. 9, the thick broken line or the thick dashed-dotted line indicates the range of the optical path. In a case where the document existing at a reference reading position $P_1$ is read, a region in which the first region $R_1$ and the second region $R_2$ shown in FIG. 9 are overlapped is the overlap region Rc. On the other hand, in a case where the same document shifts to the Z-axis positive direction and exists at a position $P_2$, the first line sensor 21a1 reads the first region $R_{12}$, and the second line sensor 21a2 reads the second region $R_{22}$. Accordingly, in the case, the overlap region is Rc2.

As described above, when the document is displaced from the reference reading position (floating occurs), the range read by the first line sensor 21a1 and the second line sensor 21a2 becomes wide due to the increase of the optical path length. For example, in a case where the document as shown in FIG. 6 exists at the position $P_2$, the first region $R_{12}$ becomes wider than the first region $R_1$, the second region $R_{22}$ becomes wider than the second region $R_2$, and the overlap region Rc2 becomes wider than the overlap region Rc.

Since the number and size of the first line sensor 21a1 and the second line sensor 21a2 are not changed, when a wider range is read than in the case where the document exists at appropriate reference reading position, the first read image and the second read image which are the reading results of the first line sensor 21a1 and the second line sensor 21a2 are in a reduced state as compared with the case where the document existing at the reference reading position P1 is read.

Figure 10:
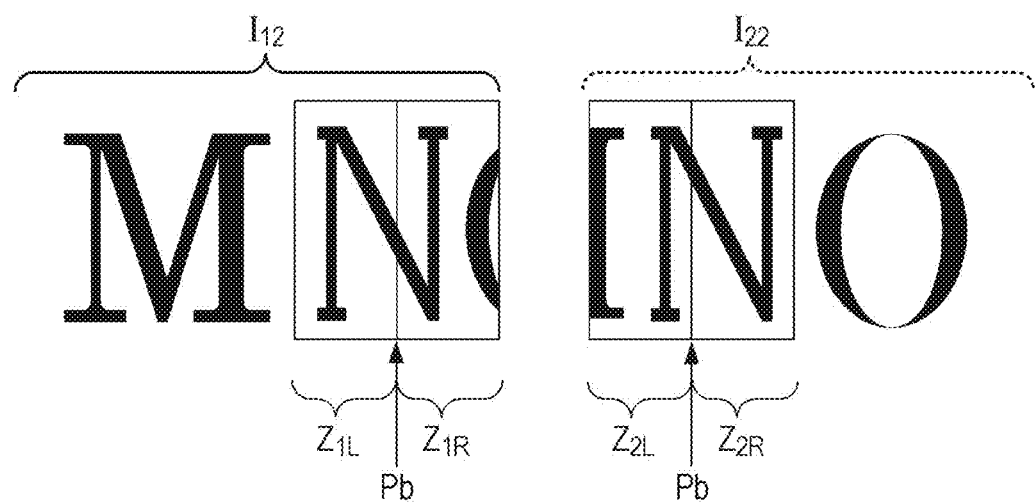
FIG. 10 is an explanatory diagram of the first read image and the second read image in a state where displacement from a reference reading position occurs.

FIG. 10 shows an example of the first read image $I_{12}$ and the second read image $I_{22}$ in a case where the first region $R_{12}$ and the second region $R_{22}$ shown in FIG. 6 are read. That is, in the example shown in FIG. 10, images are reduced than the reading results in the case where the displacement does not occur, and a part of other characters "O" and "M" is included in the region $Z_{1L}$, the region $Z_{1R}$, the region $Z_{2L}$, and the region $Z_{2R}$ in which only the character "N" is read in the case where the displacement does not occur. In the state where such reduction occurs, even in a case where the combining is performed at the same binding position as in the case where the displacement does not occur, the image in the region $Z_{1L}$ and the image in the region $Z_{2L}$ shown in FIG. 10 are mixed by the weighting which is changed for each position as long as the mixing is performed based on the binding position. The image in the region $Z_{1R}$ and the image in the region $Z_{2R}$ shown in FIG. 10 are mixed by the weighting which is changed for each position.

Since the image at the binding position Pb passes the optical path indicated by the thin broken line or the dashed-dotted line in FIG. 9, in a case where the document exists at the reference reading position $P_1$, an image indicating the reading results at the same position is obtained. However, in a case where the document does not exist at the reference reading position $P_1$, an image indicating the reading results at the same position is not obtained. In the example shown in FIG. 10, different portions of the oblique line of the character "N" are cut by the binding position Pb in the first read image $I_{12}$ and the second read image $I_{22}$. Accordingly, even when the images at the binding position Pb are overlapped, the images are not bound appropriately.

Figure 11:
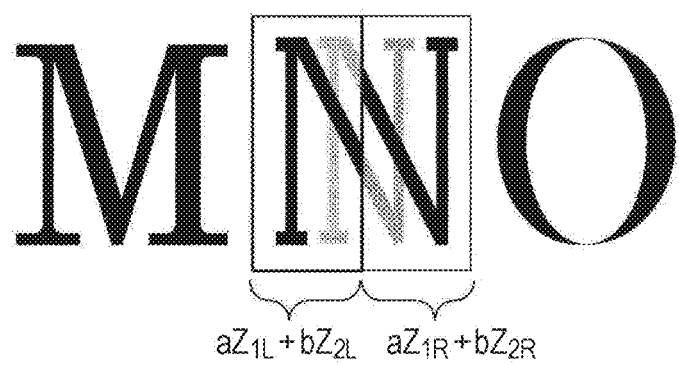
FIG. 11 is an explanatory diagram of the mix in a state where the displacement from the reference reading position occurs.

FIG. 11 is a diagram showing an image after the combining of the reading results shown in FIG. 10 by the mixing. As shown in the example, since the image in the region $Z_{1L}$ and the image in the region $Z_{2L}$ shown in FIG. 10 deviate significantly, even when the weighted addition ($aZ_{1L}+bZ_{2L}$) is performed based on the images in the regions, the deviation cannot be eliminated, and the image based on the first read image $I_{12}$ appears dark and the image based on the second read image $I_{22}$ appears thin.

Since the image in the region $Z_{1R}$ and the image in the region $Z_{2R}$ shown in FIG. 10 deviate significantly, even when the weighted addition ($aZ_{1R}+bZ_{2R}$) is performed based on the images in the regions, the deviation cannot be eliminated, and the image based on the first read image $I_{12}$ appears thin and the image based on the second read image $I_{22}$ appears dark. Further, the oblique line of N is separated into different straight lines at the binding position Pb. That is, when the combining is performed without considering the variation of the document position from the reference reading position, the image quality may be deteriorated such as the straight line (oblique line portion of character "N") which is non-parallel and non-perpendicular in the main scanning direction on the overlap region is separated into two different straight lines.

Figure 12:
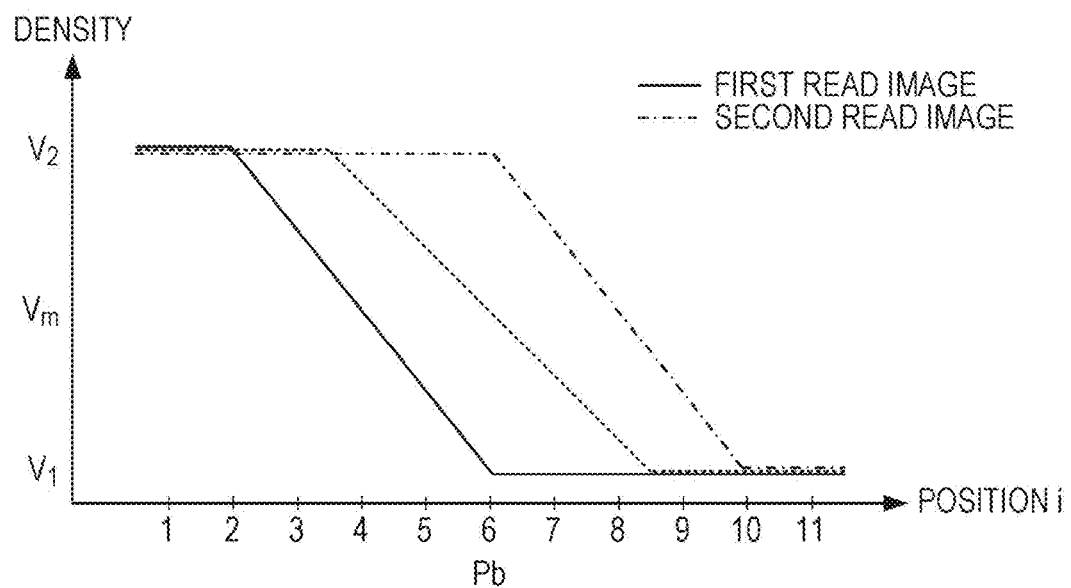
FIG. 12 is an explanatory diagram of deformation.

In the embodiment, the combining section 11 deforms the images in the overlap region in the main scanning direction before the mixing. FIG. 12 is a diagram for describing a deformation in the main scanning direction. In FIG. 12, an example of the first read image is indicated by a solid line, and an example of the second read image is indicated by a dashed-dotted line. The horizontal axis is a position of a pixel, and the vertical axis is density (value according to detection intensity of each element). In the example, the position i=6 is the binding position Pb. Since each image is density information at each position of the pixels, the density has a discrete value for each position, but a density change is indicated by a line to facilitate understanding of the deformation in FIG. 12. That is, the density between positions of the pixels is estimated to change continuously, and the density between positions of the pixels can be obtained by, for example, an interpolation calculation such as cubic interpolation.

In FIG. 12, it is assumed that the density changes abruptly from a certain value $V_2$ to another certain value $V_1$ in the front/rear of the binding position i=6, and a figure in which the density is Vm at the binding position i=6 is formed in the overlap region. Accordingly, in the case where the document is read in the state where the document is not displaced from the reference reading position, it is expected ideally that the density at the binding position i=6 is Vm and the density in the front/rear of the position is changed abruptly.

In the first read image and the second read image shown in FIG. 12, the density at the position i=6 is not Vm, and regions where the density is changed abruptly also deviate. That is, in a case where the reading with the reduction as shown in FIG. 10 occurs, each portion of a regular image is reduced so as to move from the end portion of the image to a center portion in each read image. For example, in the first read image shown in FIG. 12, the abrupt change region of the density deviates to the left side of the graph (region side in which value at position i is small). In the second read image, the abrupt change region of the density deviates to the right side of a graph (region side in which value at position i is large).

In the embodiment, the combining section 11 enlarges the image from the center portion of the image to the end portion side to perform the deformation. For example, the first read image shown in FIG. 12 is enlarged to the right side of the graph (region side in which value at position i is large), the second read image shown in FIG. 12 is enlarged to the left side of the graph (region side in which value at position i is small). At the time, the combining section 11 set an enlargement ratio of the first read image and an enlargement ratio of the second read image to the same value (or substantially same value). For this reason, the first read image and the second read image are corrected such that the density values of respective pixels approach each other toward the binding position Pb. As a result, with the enlargement, both the first read image and the second read image approach an image such as a broken line in which the density is changed abruptly in the front/rear of the binding position with the binding position as the center as shown in FIG. 12.

Figure 13:
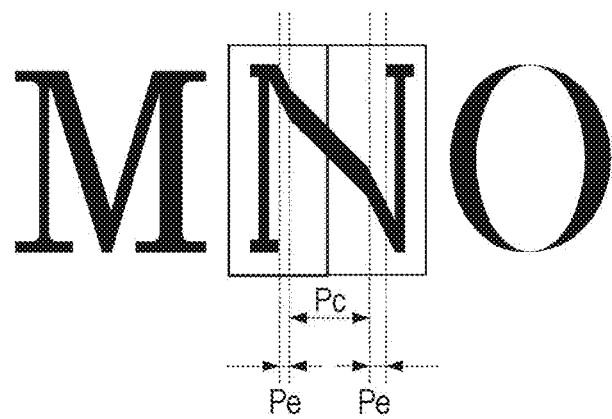
FIG. 13 is an explanatory diagram for describing an example in which a character is deformed.

FIG. 13 shows an example in a case where the first read image $I_{12}$ and the second read image $I_{22}$ shown in FIG. 10 are deformed. FIG. 13 shows an example that the oblique line portion of the character "N" is deformed, and although an angle of the oblique line changes so as to approach the main scanning direction due to the deformation, the oblique line is a straight line. That is, since the state where the document floats from the reference reading position of the document platen occurs due to the bound portion or the like of the book (side opposite to spine cover), the state occurs often locally. Accordingly, the enlargement is performed often on a part of the document. When a part of the image is enlarged in the main scanning direction, the straight line which is non-parallel and non-perpendicular in the main scanning direction is extended in the main scanning direction. Therefore, the angle of the straight line approaches the main scanning direction.

In a case where the enlargement is performed on a part and the enlargement is not performed around the part (both ends in the main scanning direction), the angle of the straight line is an angle as it is being read at the portion that the enlargement is not performed. For this reason, an image of a non-straight line in a case where a straight line is read is in a state of including both end portions Pe and the center portion Pc having an angle closer to the main scanning direction than angles of the both end portions shown in FIG. 13. In the embodiment, the straight line which is non-parallel and non-perpendicular in the main scanning direction as described above are combined as an image having the both end portions and the center portion.

Accordingly, it is possible to perform the combining without significant deterioration of the image quality such as the separation of the straight line although the straight line which is non-parallel and non-perpendicular in the main scanning direction such as the oblique line portion of the character "N" shown in FIG. 13 becomes the non-straight line. Accordingly, it is possible to improve the image quality of the scan data in which the outputs of the plurality of line sensors 21a are combined. Here, there is no need to strictly determine the direction for non-parallel and non-perpendicular with respect to the main scanning direction. That is, when assuming a situation where at least one oblique straight line inclined from the main scanning direction and the sub scanning direction (for example, straight line of 45° with respect to both directions) is read as an image of a non-straight line, the effect of the embodiment can be confirmed.

(3) Scan Processing

Figure 14:
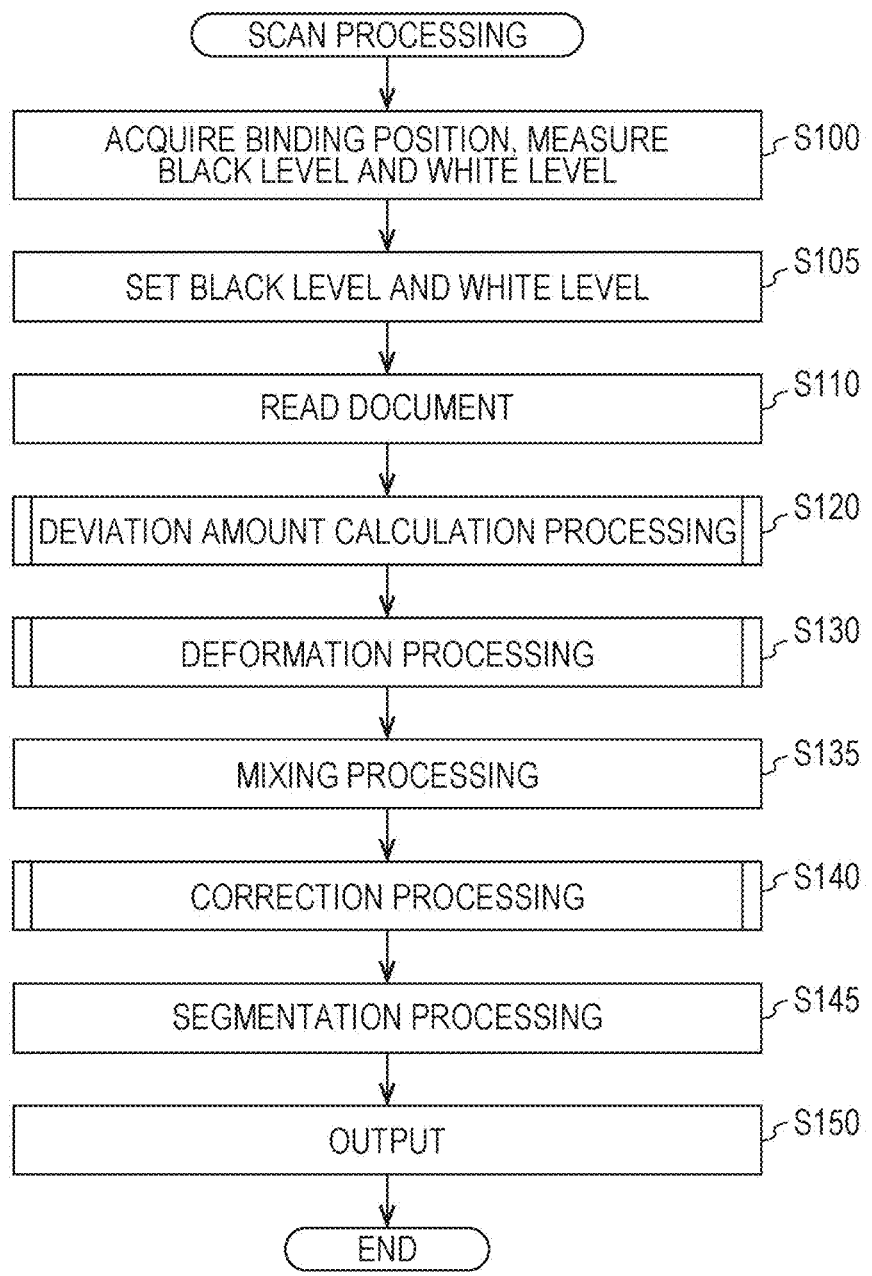
FIG. 14 is a flowchart of scan processing.

Next, a procedure of scan processing will be described with reference to a flowchart shown in FIG. 14. When the user places the document on the document platen and performs a scan instruction by the operation section 80, the controller 10 receives the scan instruction and starts the scan processing shown in FIG. 14. When the scan processing is started, the controller 10 acquires the binding position and measures the white level and the black level (step S100).

The binding position may be acquired before scanning of the document, and in the embodiment, acquisition processing of the binding position Pb is performed at an arbitrary timing by the user. When the acquisition processing is started, the controller 10 controls the sub scanning apparatus 41 to move to a reading position of the combining mark and reads the combining mark. The controller 10 records a position of an element which is the binding position Pb of each line sensor 21a in a memory from the reading result of the combining mark. Here, it is assumed that the acquisition processing of the binding position Pb is executed in advance. In the case, the controller 10 acquires the binding position Pb of each line sensor 21a with reference to the memory in step S100.

Next, the controller 10 measures the black level. That is, the controller 10 controls the sub scanning apparatus 41 to move to a reading position of the black reference plate B, performs the reading of the black reference plate B, and acquires the reading result as the black level. Next, the controller 10 measures the white level. That is, the controller 10 controls the sub scanning apparatus 41 to move to a reading position of the white reference plate W, performs the reading of the white reference plate W, and acquires the reading result as the white level.

Next, the controller 10 sets the black level and the white level (step S105). That is, the controller 10 sets the black level and the white level of the element of each line sensor 21a based on the black level and the white level measured in step S100. Specifically, the controller 10 sets a gain such that intensity between the black level and the white level measured in step S100 can be measured.

Next, the controller 10 read the document (step S110). That is, the controller 10 controls the light source 31 to turn on the LED and controls the line sensor 21a and the sub scanning apparatus 41 to repeatedly execute the acquisition of the output of the line sensor 21a and the movement of the sub scanning apparatus 41. At the time, the controller 10 performs a shading correction. That is, each line sensor 21a includes a plurality of elements arranged in the main scanning direction, and each element (not shown) is connected to an amplification circuit. The controller 10 sets a gain of the amplification circuit to the gain set in step S105 and causes each element to output an analog signal as a detection result.

When the detection result after the gain acts on each element is output, the analog signal as the output is output subsequently and serially from a scanning circuit (not shown) of each line sensor 21a. The sensor 21 includes the A/D conversion circuit (not shown), the analog signal output serially is converted to a digital signal by the A/D conversion circuit. The converted digital signal is output to the controller 10 in a state associated with the line sensor 21a which is a reading source.

Next, the combining section 11 performs deviation amount calculation processing (step S120). The deviation amount calculation processing calculates a relative deviation amount in the main scanning direction between the first read image and the second read image obtained by reading the same position in the overlap region based on a variation in shading calculated from the first read image and the second read image.

Since the plurality of line sensors 21a exist in the embodiment, the overlap region exists in each pair of two adjacent line sensors 21a. One reading result of the two adjacent line sensors 21a is the first read image, and the other reading result is the second read image. The calculation of the deviation amount is executed for each of a plurality of overlap regions generated in one line in the main scanning direction. The details on the deviation amount calculation processing will be described below. Since the step S120 is performed for each line extending in the main scanning direction each time a document is read, it is possible to dynamically perform the deformation according to the deviation amount which can be varied depending on a document mode (for example, presence or absence of bound portion) and a situation (for example, whether scan includes bound portion).

Next, the combining section 11 performs deformation processing (step S130). The deformation processing deforms (enlargement in the embodiment) the first read image and the second read image based on the deviation amount calculated in step S120, and the details will be described below. Needless to say, the deformation processing is executed also for each of a plurality of overlap regions generated in one line in the main scanning direction.

Next, the combining section 11 performs mixing processing (step S135). The mixing processing weights and adds the first read image and the second read image, and mixes the first read image and the second read image using the predetermined weighting value ($a_i$ and $b_i$) described above. Needless to say, the mixing processing is executed also for each of a plurality of overlap regions generated in one line in the main scanning direction.

When the mixing processing ends for all lines arranged in the sub scanning direction, the acquisition section 12 and the correction section 13 execute correction processing (step S140). The correction processing corrects an image after the combining based on the deviation amount calculated in step S120, and the details will be described below.

When scan data is generated by the correction processing, the controller 10 executes segmentation processing that segments an image having a size determined by a scan setting (step S145) and outputs the obtained scan data (step S150). That is, the controller 10 outputs the scan data to the computer 90 through the communication section.

(4) Deviation Amount Calculation Processing

Figure 15:
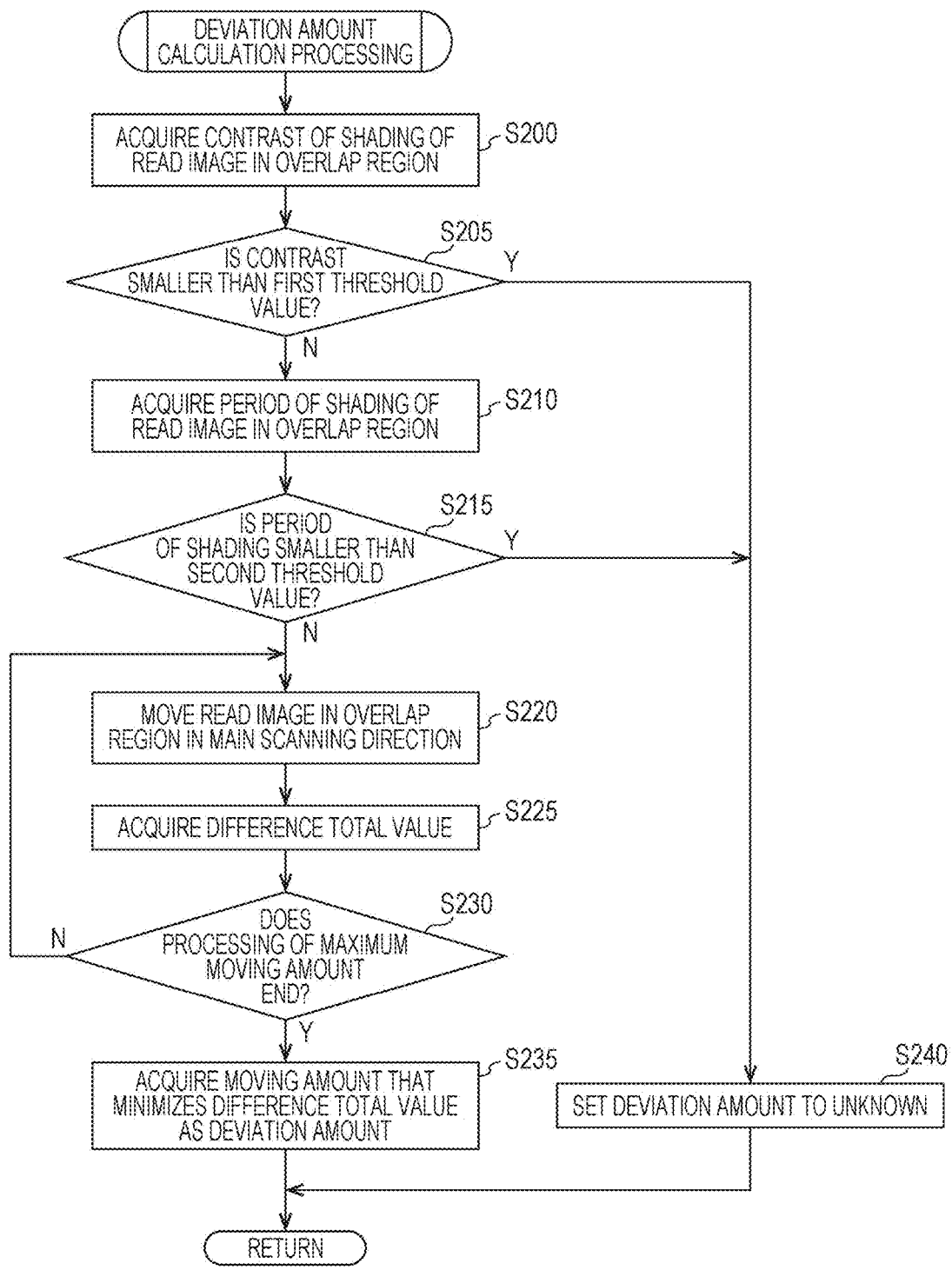
FIG. 15 is a flowchart of deviation amount calculation processing.

Next, a procedure of the deviation amount calculation processing will be described with reference to a flowchart shown in FIG. 15. In the embodiment, the deviation amount is calculated based on a moving amount in a case of moving at least any one of the first read image and the second read image in the main scanning direction and the matching degree between the first read image and the second read image after the movement. Accordingly, it is impossible to calculate a significant deviation amount under a situation in which the calculation cannot be executed effectively. In the embodiment, in the case where the significant deviation amount cannot be calculated, processing is employed to set the deviation amount to unknown without calculating the amount. For this reason, in the deviation amount calculation processing, processing (steps S200 to S215) is performed to determine whether the significant deviation amount can be calculated.

Specifically, the combining section 11 acquires the contrast of the shading of a read image in the overlap region (step S200) and determines whether the contrast is smaller than a predetermined first threshold value (step S205). In a case where it is determined that the contrast is smaller than the predetermined first threshold value in step S205, the combining section 11 sets the deviation amount to unknown (step S240). That is, in the case where the contrast of the shading in the overlap region is small, it is difficult to determine whether the matching degree significantly changes in the case of moving the first read image and the second read image. In the case where the contrast is small, the deviation amount is set to unknown without calculating the deviation amount.

The contrast may be an index for evaluating whether there is a shading variation to an extent that it can be determined whether there is the significant change in the matching degree. For example, the contrast can be calculated by a difference between a maximum value and a minimum value of the densities of the first read image and the second read image included in the overlap region or the like. The overlap region may be determined in advance. For example, it is possible to employ a configuration in which a region having a specific number of pixels in the front/rear of the binding position Pb is set as the overlap region or the like. The first threshold value is a predetermined value as a threshold value for eliminating a small contrast to an extent that it is impossible to calculate the significant deviation amount.

In step S205, in the case where it is not determined that the contrast is smaller than the predetermined first threshold value, the combining section 11 acquires a period of the shading of the read image in the overlap region (step S210) and determines whether the period of the shading is smaller than a predetermined second threshold value (step S215). In step S215, in a case where it is determined that the period of the shading is smaller than the predetermined second threshold value, the combining section 11 sets the deviation amount to unknown (step S240).

That is, in the case where the period of the shading in the overlap region is small, a variation in the shading is severe in the first read image and the second read image, and the first read image and the second read image frequently match with each other at a plurality of moving amounts in the case of relatively moving the both images in the main scanning direction. For this reason, it is difficult to calculate which moving amount is a true deviation amount in the main scanning direction for the first read image and the second read image. In the case where the period of the shading is short, the deviation amount is set to unknown without calculating the deviation amount.

The period of the shading may be an index for evaluating repetition frequency of the change in the density with respect to a position change of the first read image and the second read image. For example, the period can be calculated by a value obtained by adding an absolute value of the density change between adjacent pixels over the overlap region. In the example shown in FIG. 12, the value can be acquired by calculating and adding absolute values of (density at position i+1−density at position i) from i=1 to 10 for both the first read image and the second read image. The second threshold value is a predetermined value as a threshold value for eliminating a small period to an extent that it is impossible to specify the significant matching degree.

In step S215, in a case where it is not determined that the period of the shading is smaller than the second threshold value, the combining section 11 moves the read image of the overlap region in the main scanning direction (step S220). In the embodiment, processing of moving any one of the first read image and the second read image in a predetermined direction by one pixel is repeated. That is, in the configuration in which the displacement of the document from the reference reading position occurs in the floating direction from the document platen as in the embodiment, the displacement of the document moves the image to the left side of the graph in the first read image and moves the image to the right side of the graph in the second read image as shown in FIG. 12.

The combining section 11 moves the read image in a direction opposite to the movement of the image by the displacement of the document. That is, the combining section 11 sets a moving direction of the first read image to the right direction of the graph shown in FIG. 12 and sets a moving direction of the second read image to the left direction of the graph shown in FIG. 12. The combining section 11 moves any one of the first read image and the second read image by one pixel for one loop processing of steps S220 to S230. The combining section 11 alternatively moves the first read image and the second read image in a repetition step of the loop processing. For example, in a case where the movement of the first read image is performed in a certain loop processing, the movement of the second read image is performed in the next loop processing. The moving amount of each read image is recorded in the memory.

Figure 16:
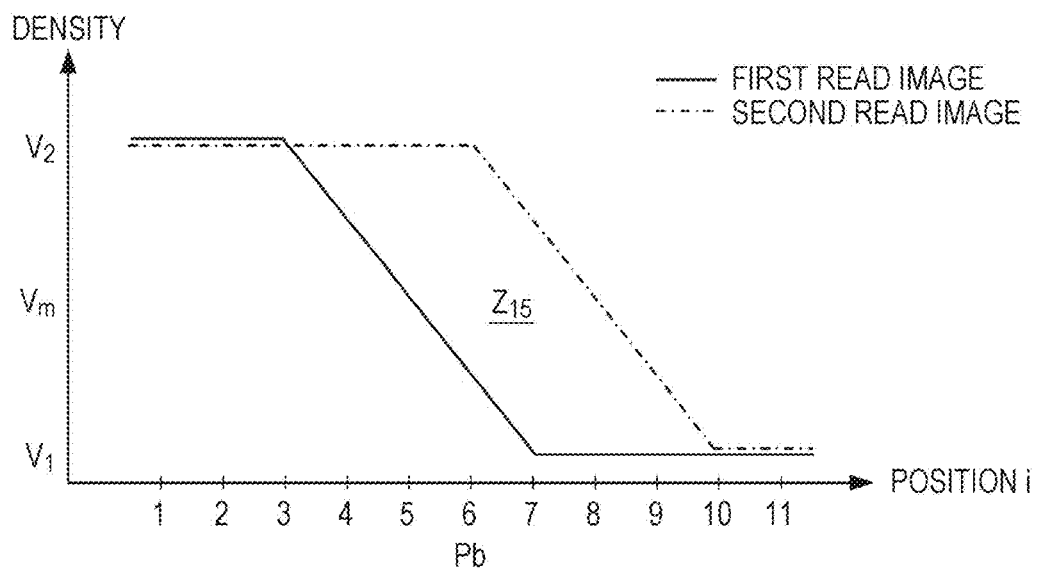
FIG. 16 is a diagram showing a movement in the deviation amount calculation.
Figure 17:
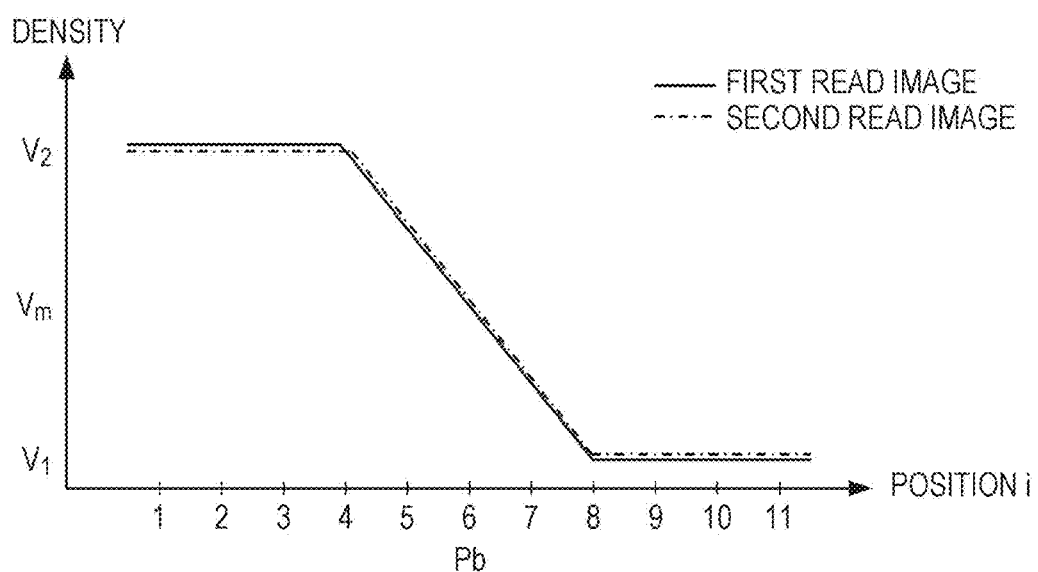
FIG. 17 is a diagram showing minimization of a difference after the movement.

FIG. 16 shows an example in a case where the first read image moves to the right side of the graph by one pixel in the initial processing of the loop processing in the example shown in FIG. 12. FIG. 17 shows an example in a case where the first read image moves to the right side of the graph by two pixels and the second read image moves to the left side of the graph by two pixels in the fourth processing of the loop processing in the example shown in FIG. 12.

Next, the combining section 11 acquires a difference total value (step S225). That is, the combining section 11 acquires a difference in density for each position of the first read image and the second read image after the movement and acquires a total value. For example, the difference total value in FIG. 16 is a value corresponding to an area of region $Z_{15}$ interposed between the first read image and the second read image. In FIG. 17, since the first read image and the second read image substantially match with each other, the difference total value is zero substantially.

When the difference total value is acquired, the combining section 11 determines whether the processing of a maximum moving amount ends (step S230) and repeats the processing after step S220 before it is determined that the processing of the maximum moving amount ends. The maximum moving amount is a predetermined value as a maximum value of the moving amount of the first read image or the second read image and is calculated in advance from the maximum value of a possible deviation.

In step S230, in a case where it is determined that the processing of the maximum moving amount ends, the combining section 11 acquires a moving amount that minimizes the difference total value as the deviation amount (step S235). That is, the combining section 11 regards that as the difference total value indicating the difference in the shading between the first read image and the second read image after the movement decreases, the matching degree increases, and acquires the moving amount that minimizes the difference total value as the deviation amount. When the moving amount is acquired as the deviation amount, the combining section 11 acquires the sum of the moving amount of the first read image and the moving amount of the second read image as the moving amount, that is, the deviation amount with reference to the memory.

For example, in a case where the difference total value after the movement shown in FIG. 17 is the minimum, four which is the sum of two which is the moving amount of the first read image and two which is the moving amount of the second read image is acquired as the deviation amount. Needless to say, various other methods may be employed as the method of acquiring the deviation amount. For example, the deviation amount may be specified based on the number of executions of the loop processing or the like at a stage where the minimum difference total value is calculated. The acquired deviation amount is recorded in the memory in association with the position of the overlap region (the fact is recorded even in the case of being unknown in step S240).

In a case where a plurality of the moving amounts that minimize the difference total value are acquired, one moving amount (for example, one with small moving amount) is employed. In the case, there is a possibility that the deviation amount is not an integer (for example, deviation amount of 0.5 pixels), but even when such a deviation remains, the influence thereof is reduced effectively by the mixing processing.

In a case where the document does not exist at the reference reading position due to the floating of the document, since the image is read in a reduced manner as compared with the case of existing at the reference reading position, the pixels at the binding position Pb in the first read image and the second read image often does not show an image at the same position. However, since the influence by the floating of the document is the movement of the image due to the reduction, when the image is moved at least in the main scanning direction, it is possible to generate a state where the reading results at the same position overlap (or substantially overlap). When the first read image and the second read image after the movement match with each other, there is a high possibility that an image at the same position i is a reading result at the same position. Accordingly, when the matching degree of the image after the movement by the loop of steps S220 to S230 is analyzed, it is possible to specify a deviation degree from an original reading result and specify the moving amount.

(5) Deformation Processing

Figure 18:
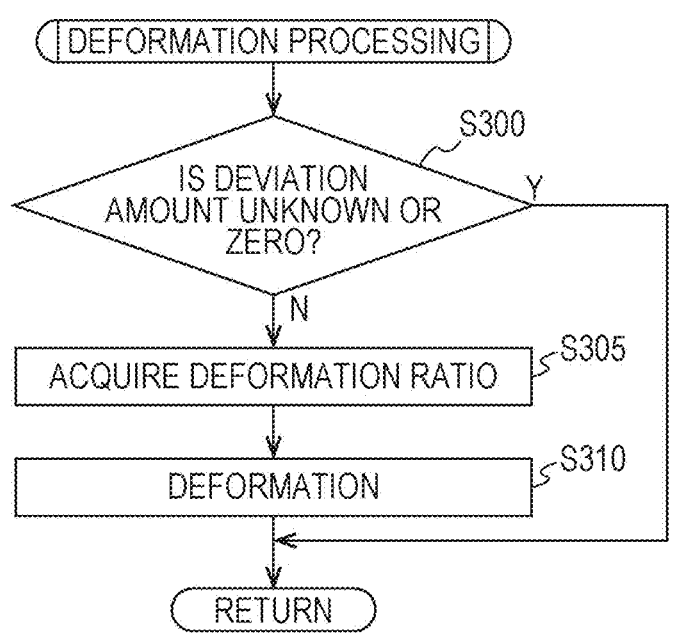
FIG. 18 is a flowchart of deformation processing.

Next, a procedure of deformation processing will be described with reference to a flowchart shown in FIG. 18. In the embodiment, the deformation is performed such that a pixel the first read image and a pixel of the second read image indicating the reading result of the overlap region relatively move by the deviation amount in the main scanning direction by the deformation. For this purpose, the combining section 11 determines whether the deviation amount in an overlap region to be processed is unknown or zero (step S300) in the deformation processing.

That is, since the plurality of the overlap regions are included in one line extending in the main scanning direction in the embodiment and the deformation processing is executed for each of the overlap regions as the processing target, the combining section 11 determines whether the deviation amount in the overlap region to be processed is set to unknown in step S240. The combining section determines whether the deviation amount in the overlap region to be processed is acquired as zero in step S235. In step S300, in a case where it is determined that the deviation amount is unknown or zero, the combining section 11 does not set the overlap region to be processed as a deformation target and skips steps S305 and S310.

In step S300, in a case where it is not determined that the deviation amount is unknown or zero, the combining section 11 acquires a deformation ratio (step S305). The deformation ratio is processing for moving a reading result of a portion read at the binding position Pb in the case where the document is not displaced to the binding position Pb. In the embodiment, the deformation is performed from a pixel on the center side of the line sensor 21a toward the binding position Pb side in each of the first read image and the second read image.

Figure 19:
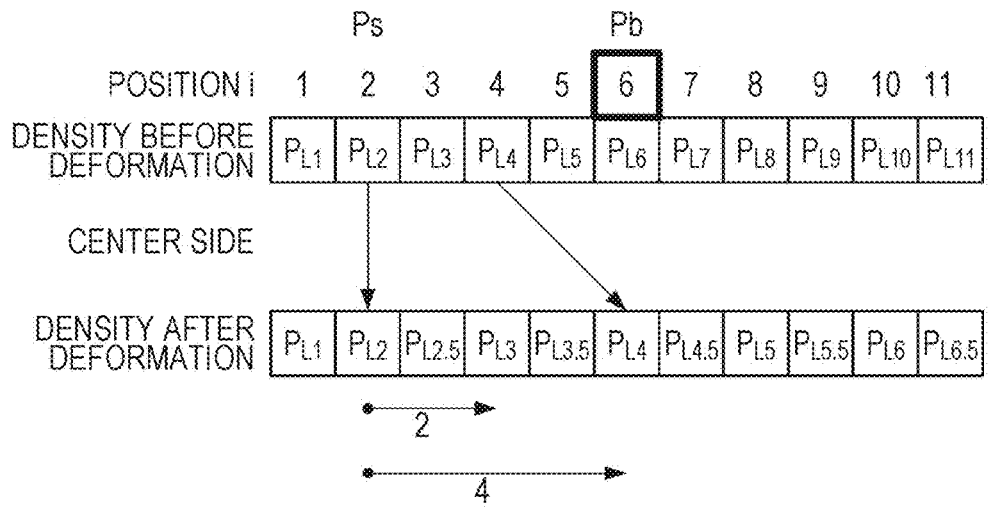
FIG. 19 is an explanatory diagram of the deformation.
Figure 20:
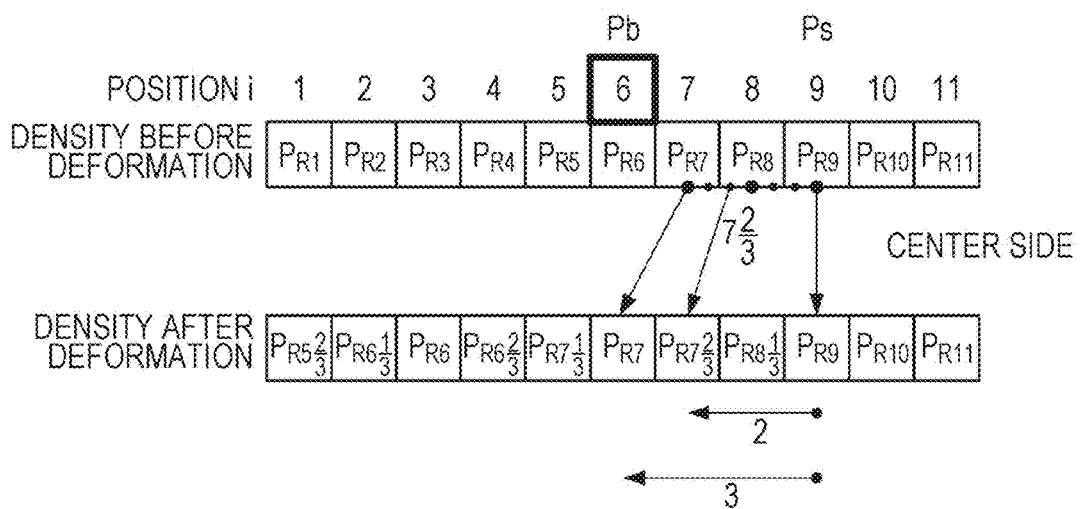
FIG. 20 is an explanatory diagram of the deformation.

In order to perform the deformation, the combining section 11 determines a deformation start position located on the center side of the line sensor 21a from the binding position Pb. The deformation start position is a position of a pixel which is the starting point of the deformation and a pixel existing at a position moved by a distance exceeding a deviation amount to the center side of the line sensor 21a from the binding position Pb. FIGS. 19 and 20 are diagrams for describing the deformation, FIG. 19 schematically shows the first read image, and FIG. 20 schematically shows the second read image. In the figures, it is assumed that the first read image and the second read image are read by a first line sensor 21a1 and a second line sensor 21a2 equivalent to FIG. 5, and the position of the pixel will be described using a position i common to both images.

In the figures, density before the deformation of the first read image is indicated by $P_{L1}$ to $P_{L11}$, and density before the deformation of the second read image is indicated by $P_{R1}$ to $P_{R11}$. Further, in the figures, the binding position Pb is position i=6. Here, it is assumed that the deviation amount of the first read image in FIG. 19 is 2 and the deviation amount of the second read image in FIG. 20 is 1. The deviation amount of each image is ½ of the relative deviation amount in the main scanning direction specified in step S235. In a case where ½ of the relative deviation amount is a non-integer, for example, it is employed a configuration in which an incremented value is regarded as the deviation amount of the first read image, and a lowered value is regarded as the deviation amount of the second read image or the like.

In the example of the first read image shown in FIG. 19, the center side of the first line sensor 21a1 is a region where a pixel in which the position i is indicated by a value smaller than 1 exists. In the example of the second read image shown in FIG. 20, the center side of the second line sensor 21a2 is a region where a pixel in which the position i is indicated by a value larger than 11 exists.

In the examples, the deformation start position is a position moved by deviation amount+fixed value 2 to the center side from the binding position Pb. Accordingly, the deformation start position Ps in FIG. 19 is a pixel at position i=2 moved by deviation amount 2+fixed value 2 to the center side from the binding position Pb, and the deformation start position Ps in FIG. 20 is a pixel at position i=9 moved by deviation amount 1+fixed value 2 to the center side from the binding position Pb.

When the deformation start position is determined, the combining section 11 acquires the deformation ratio as (distance between binding position Pb and deformation start position Ps)/((distance between binding position Pb and deformation start position Ps)−deviation amount) for each of the first read image and the second read image. For example, the deformation ratio in the example shown in FIG. 19 is 2 (=4/(4−2)), and the deformation ratio in the example shown in FIG. 20 is 3/2 (=3/(3−1)).

Next, the combining section 11 deforms each of the first read image and the second read image at each deformation ratio (step S310). That is, the combining section 11 moves a pixel existing on a side opposite to the center side with the deformation start position as the starting point according to a distance from the deformation start position before the deformation. Specifically, the combining section 11 moves the pixel having density before the deformation to a position distant from the deformation start position by a value obtained by multiplying the distance from the deformation start position before the deformation by the deformation ratio. A pixel exceeding a predetermined range after the deformation is ignored.

For example, in the example shown in FIG. 19, a pixel (density value $P_{L4}$) existing at position i=4 before the deformation has a distance of 2 from the deformation start position Ps and has a value of 4 multiplied by the deformation ratio 2 of the first read image. Accordingly, when the deformation is performed, the pixel existing at position i=4 moves to position i=6, and density after the deformation of the pixel existing at position i=6 becomes the density value $P_{L4}$. In the example shown in FIG. 20, a pixel (density value $P_{R7}$) existing at position i=7 before the deformation has a distance of 2 from the deformation start position Ps and has a value of 3 multiplied by the deformation ratio 3/2 of the second read image. Accordingly, when the deformation is performed, the pixel existing at position i=7 moves to position i=6, and density after the deformation of the pixel existing at position i=6 becomes the density value $P_{R7}$. The deformation is executed within the predetermined range, and in the examples shown in FIGS. 19 and 20, a pixel having a position outside the range of positions i=1 to 11 after the deformation is ignored.

In the configuration of specifying a moving distance of the pixel based on the deformation ratio as described above, a pixel in which position i is not the integer by the movement or a pixel which cannot be filled by the movement of the pixel before the deformation may occur. In the case, density of a pixel in which position i becomes the integer after the deformation is generated by the interpolation calculation. For example, in the example shown in FIG. 19, the distance from the deformation start position after the deformation is 1 in a pixel at position i=3 after the deformation. Accordingly, the distance from the deformation start position before the deformation is distance from the deformation start position after the deformation/deformation ratio (1/2). Therefore, a density value of the pixel at position i=3 after the deformation is a density value $P_{L2.5}$ of a pixel at position i=2.5.

In the example shown in FIG. 20, the distance from the deformation start position after the deformation is 2 in a pixel at position i=7 after the deformation. Accordingly, the distance from the deformation start position before the deformation is distance from the deformation start position after the deformation/deformation ratio (2/(3/2)). Therefore, a density value of the pixel at position i=7 after the deformation is a density value $P_{R7(2/3)}$ of a pixel at position i=7(2/3). Density of a pixel at a position of the non-integer is acquired by the interpolation calculation (for example, bi-cubic interpolation or bilinear interpolation) based on the density of a pixel at a position of the integer. Needless to say, the density calculation of the pixel at the position of the non-integer may be omitted, and the density of the pixel after the deformation may be calculated by nearest neighbor interpolation or the like. In particular, in a case of performing high-speed scanning (for example, scanning A4 document with a speed of 100 ppm or more at 600 dpi), it is desirable to employ an interpolation method with a small calculation amount such as bilinear interpolation or nearest neighbor interpolation.

According to the deformation described above, it is possible to relatively move the pixel of the first read image and the pixel of the second read image indicating the reading results at the same position of the overlap region by the deviation amount in the main scanning direction by the deformation. For example, in the examples shown in FIGS. 19 and 20, the deviation amount of the first read image is 2, and the deviation amount of the second read image is 1. For this reason, at the binding position Pb in the state where the document is not displaced, the density of an image to be read in both the first read image and the second read image is density $P_{L4}$ at position i=4 deviated by position 2 from the binding position Pb to the center side in FIG. 19, and density $P_{R7}$ at position i=7 deviated by position 1 from the binding position Pb to the center side in FIG. 20.

In the examples, both the density $P_{L4}$ at position i=4 and the density $P_{R7}$ at position i=7 move to the binding position Pb by the deformation, and the sum of both moving amounts is 3. Since the sum of the moving amounts matches the value of the relative deviation amount specified in step S235, the deformation in step S310 is the deformation for relatively moving the pixel of the first read image and the pixel of the second read image indicating the reading results at the same position of the overlap region by the deviation amount in the main scanning direction by the deformation. According to the configuration, it is possible to perform the deformation so as to eliminate or reduce the deviation.

Further, in the embodiment, as the displacement (floating) of the document from the reference reading position increases, the deviation amount increases. As the displacement of the document from the reference reading position increases, the size of the document on the image decreases. In the embodiment, in a case where the deviation amount is large, the combining section 11 performs the deformation so as to increase the deformation ratio of the image in the overlap region in the main scanning direction as compared with a case where the deviation amount is small. For example, since the deviation amount of the first read image shown in FIG. 19 is larger than the deviation amount of the second read image shown in FIG. 20, the deformation ratio of the first read image is set to a value larger than the deformation ratio of the second read image. According to the configuration, it is possible to deform so as to reduce the influence of the displacement of the document according to the deviation amount.

Further, in the embodiment, the combining section 11 does not shift the image during the deformation, but performs the deformation (enlargement) with the deformation start position as the starting point. The deformation is executed in the predetermined range (positions i=1 to 11 in FIGS. 19 and 20), and the pixel having a position outside the predetermined range after the deformation is ignored. Accordingly, a resolution set at the time of scanning is maintained without increasing or decreasing of the number of the pixels with the deformation.

(6) Correction Processing

Figure 21:
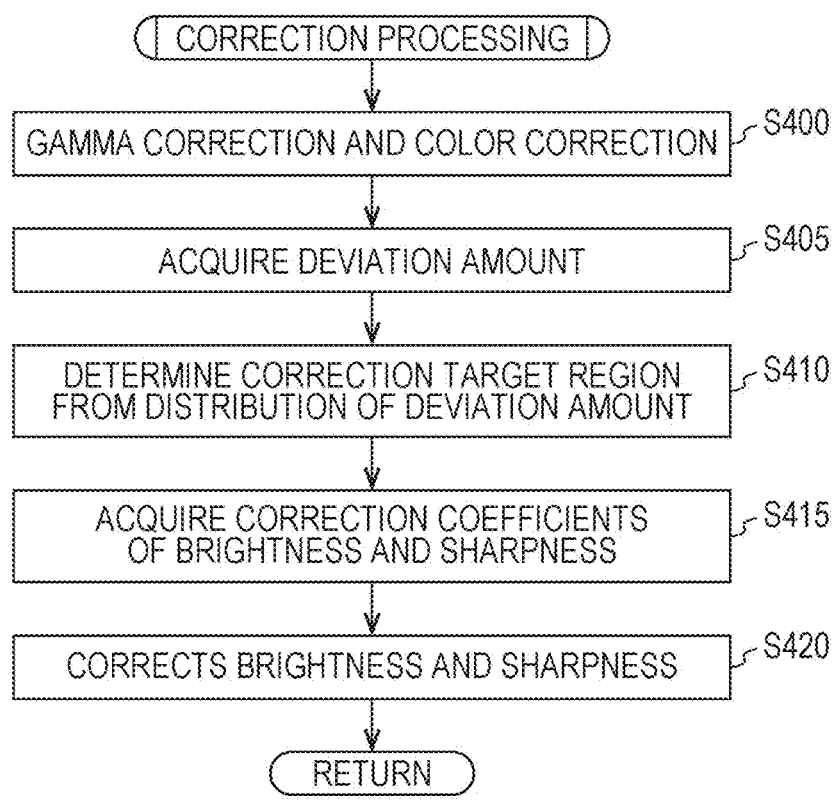
FIG. 21 is a flowchart of correction processing.

Next, a procedure of correction processing will be described with reference to a flowchart shown in FIG. 21. When the correction processing is started, the correction section 13 executes gamma correction and color correction on the scan data combined by the processing of the combining section 11 (step S400). The gamma correction is correction for adjusting the relationship of density with respect to a value of the scan data, and the relationship of density with respect to values of the scan data is corrected based on a predetermined gamma characteristics. The color correction is correction of color for color matching and correction for adjusting white balance and can be realized by various methods.

Figure 22:
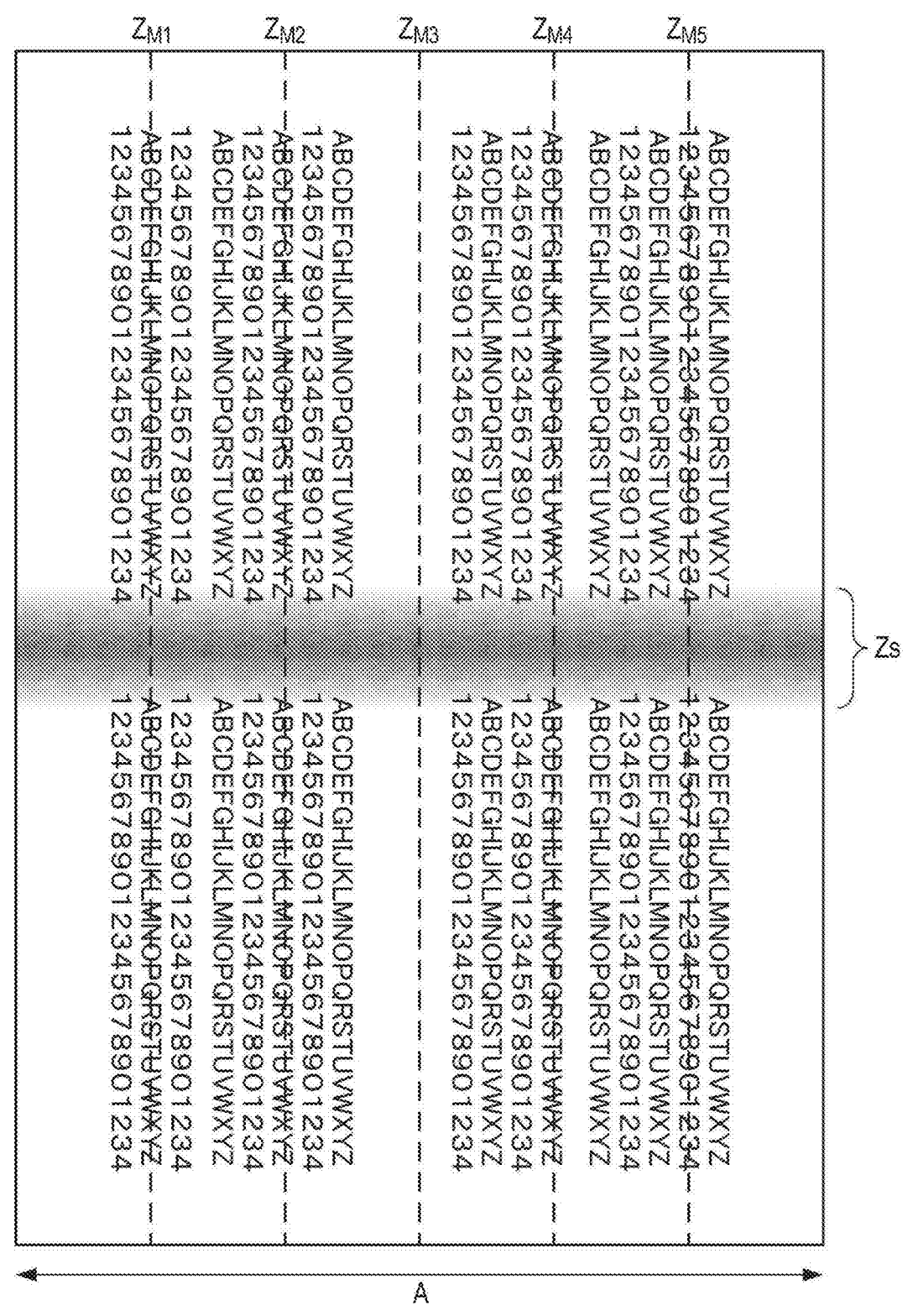

Next, the acquisition section 12 acquires the deviation amount (step S405). That is, the acquisition section 12 acquires the deviation amount (deviation amount in the entire overlap region arranged in main scanning direction and sub scanning direction) recorded in the memory in step S235 or S240. FIG. 22 is a diagram showing a book as the document, and in FIG. 22, the bound portion (region displaced so as to float from document platen when placed on document platen) of the book is shown by gradation. In the scanner 1, the plurality of the overlap regions exist in the main scanning direction, but it is assumed an example that there are five overlap regions $Z_{M1}$ to $Z_{M5}$ totally for the sake of simplicity. Table 1 exemplifies a part of the acquired deviation amount in a case where the document shown in FIG. 22 is read.

TABLE 1

| Sub scanning position | Deviation amount | | | | |
| --- | --- | --- | --- | --- | --- |
| | $Z_{M1}$ | $Z_{M2}$ | $Z_{M3}$ | $Z_{M4}$ | $Z_{M5}$ |
| n | 0 | 0 | unknown | 0 | 0 |
| n + 1 | 0 | 1 | unknown | 1 | 1 |
| n + 2 | 1 | 1 | unknown | unknown | 1 |
| n + 3 | 2 | 2 | unknown | 2 | 2 |
| n + 4 | unknown | 3 | unknown | 2 | 2 |
| n + 5 | 2 | 2 | unknown | 2 | unknown |
| n + 6 | 3 | unknown | unknown | 3 | 3 |
| n + 7 | unknown | unknown | unknown | unknown | unknown |
| n + 8 | unknown | unknown | unknown | unknown | unknown |
| n + 9 | unknown | unknown | unknown | unknown | unknown |
| . | | | . | | |
| . | | | . | | |
| . | | | | | |

In the embodiment, in a processing step of the combining section 11, processing of acquiring the deviation amount for all the overlap regions $Z_{M1}$ to $Z_{M5}$ with respect to all the sub scanning positions is performed, and the deviation amount is set to unknown or is associated with some value. In the table 1, the deviation amount is set to unknown with respect to all the sub scanning positions in the overlap region $Z_{M3}$ by reflecting that there is no character on the overlap region $Z_{M3}$ of the document shown in FIG. 22.

When the deviation amount is acquired, the correction section 13 determines a correction target region based on the distribution of the deviation amount acquired in step S405 (step S410). That is, in the embodiment, since the deviation amount is acquired for each overlap region, a discrete and local deviation amount in the main scanning direction is acquired. Even when the degree of the deviation and the displacement is observed locally, there is a high possibility that the deviation and the displacement occur in a wider range in actual usage.

For example, as shown in FIG. 22, since the bound portion of the book exists over the height direction A (length direction of spine cover) of the book, the deviation and the displacement caused by the bound portion exist over the height direction of the book which is the document. When the distribution of the deviation amount is specified, it is possible to estimate a region where an equivalent deviation or the displacement of the document according to the deviation exists based on the distribution.

Since the overlap region is a region read by different line sensors 21a in an overlapped manner, the number of the overlap regions increases with the increase of the number of the line sensors 21a. When three line sensors 21a or more are arranged along the main scanning direction, a plurality of overlap regions are formed in the main scanning direction. In the case, the plurality of overlap regions exist in the main scanning direction and are disposed such that the overlap regions extend in the sub scanning direction. Accordingly, as the overlap region increase, the number of the overlap regions in the area of the document increases.

For this reason, according to the embodiment in which the plurality of overlap regions exist in the main scanning direction, it is possible to analyze the degree of the displacement and the deviation amount of the document over the wide range of the document. Accordingly, in the configuration, when the distribution of the displacement and the deviation amount of the document in the plurality of overlap regions are analyzed, it is possible to more accurately analyze the deviation and the displacement and more accurately determine the correction target region.

The distribution may be analyzed by various methods, and the correction section 13 estimates a region where the deviation amount equal to or larger than a threshold value is distributed as the bound portion and acquires the region as the correction target region. However, since there is the case where the deviation amount is unknown, in the embodiment, the deviation amount that is unknown is estimated based on the distribution of the deviation amount. In a case where the deviation amount is specified near the overlap region where the deviation amount is unknown, the estimation is executed by referring the deviation amount. In the embodiment, the deviation amount that is unknown is replaced by the average value of the deviation amounts specified in the closest overlap region from the overlap region where the deviation amount is unknown.

For example, in the example shown in table 1, the deviation amount in the overlap region $Z_{M3}$ at sub scanning position n+1 is unknown, but the deviation amounts in five overlap regions among eight overlap regions closest to the overlap region $Z_{M3}$ are known. The correction section 13 acquires the average value of the five deviation amounts, rounds off, and specifies the deviation amount as 1. The correction section 13 subsequently repeats the estimation to acquire the deviation amount in each overlap region. Table 2 exemplifies a deviation amount obtained as a result of performing the estimation based on the deviation amount shown in Table 1.

TABLE 2

| Sub scanning position | Deviation amount | | | | |
|---|---|---|---|---|---|
| | $Z_{M1}$ | $Z_{M2}$ | $Z_{M3}$ | $Z_{M4}$ | $Z_{M5}$ |
| n | 0 | 0 | 1 | 0 | 0 |
| n + 1 | 0 | 1 | 1 | 1 | 1 |
| n + 2 | 1 | 1 | 1 | 1 | 1 |
| n + 3 | 2 | 2 | 2 | 2 | 2 |
| n + 4 | 2 | 3 | 2 | 2 | 2 |
| n + 5 | 2 | 2 | 2 | 2 | 2 |
| n + 6 | 3 | 2 | 2 | 3 | 3 |
| n + 7 | 3 | 3 | 3 | 3 | 3 |
| n + 8 | 3 | 3 | 3 | 3 | 3 |
| n + 9 | 3 | 3 | 3 | 3 | 3 |
| . | | | . | | |
| . | | | . | | |
| . | | | . | | |

When the deviation amount is acquired, the correction section 13 specifies the region where the deviation amount equal to or larger than the threshold value is distributed. In the example shown in Table 2, in a case where the threshold value is 2, a region which is indicated by a thick line is specified. The correction section 13 acquires the region where the deviation amount is equal to or larger than the threshold value as the correction target region. As a result, For example, in the example shown in FIG. 22, a region of a range Zs is acquired as the correction target region over the entire region in the main scanning direction and in the sub scanning direction.

Next, the correction section 13 corrects the brightness and the sharpness of the image in the correction target region based on the deviation amount. That is, when the reading is performed in the state where the document is displaced from the reference reading position, since the document is read on an optical path having an optical path length different from the reference optical path length, the degree of light diffusion changes, and the brightness of the reading result may vary. When the brightness correction is performed, it is possible to eliminate or reduce the variation of the brightness. On the other hand, an image detected through the optical section 61 may not be focused as expected due to the change in the optical path length. In the case, the sharpness may be decreased. When the sharpness correction is performed, it is possible to eliminate or reduce the decrease of the sharpness.

In order to perform the brightness correction and the sharpness correction, the correction section 13 acquires a correction coefficient of the brightness (shading) and a correction coefficient (correction coefficient of intensity of unsharp mask processing) of the sharpness based on the deviation amount (step S415). Specifically, in the embodiment, it is regarded that the brightness decreases in proportion to the deviation amount, a coefficient Km indicating the degree of the decrease in the brightness per the deviation amount 1 is specified in advance. It is regarded that the sharpness decreases in proportion to the increase of the deviation amount, a coefficient Ks for increasing the intensity of the unsharp mask processing in order to compensate the decrease in the sharpness per the deviation amount 1 is specified in advance.

The correction section 13 specifies the correction coefficient of each pixel based on the coefficient Km, the coefficient Ks, and the deviation amount of each pixel in the correction target region. The deviation amount of each pixel in the correction target region may be specified based on the deviation amount in the overlap region around each pixel.

For example, it is possible to employ a configuration in which the deviation amount of each pixel is specified by the interpolation calculation or the like based on the deviation amounts of the plurality of the overlap regions or the like. When the deviation amount of each pixel is specified, the correction section 13 acquires 1/(1−Km×deviation amount of each pixel) as the correction coefficient of the brightness of each pixel. The correction section 13 acquires (1+Ks× deviation amount of each pixel) as the correction coefficient of the sharpness of each pixel.

Next, the correction section 13 corrects the image after the combining obtained in step S135 based on the correction coefficient (step S420). That is, the correction section 13 performs the correction by multiplying the density value of each pixel of the image before the correction by the correction coefficient 1/(1−Km×deviation amount of each pixel) of the brightness. Since the denominator of the correction coefficient decreases as the deviation amount of each pixel increases, the correction coefficient increases as the deviation amount of each pixel increases. For this reason, in the embodiment, the correction is performed such that a correction amount becomes larger in the case where the deviation amount is large than in the case where the deviation amount is small.

The correction section 13 performs processing of increasing the sharpness by the unsharp mask processing. In the embodiment, a reference processing intensity S in the unsharp mask processing is determined in advance, the unsharp mask processing is performed for each pixel with the intensity obtained by multiplying the S by the correction coefficient (1+Ks×deviation amount of each pixel) of the sharpness. Since the correction coefficient increases as the deviation amount of each pixel increases, in the embodiment, the correction is performed such that a correction amount of the sharpness becomes larger in the case where the deviation amount is large than in the case where the deviation amount is small.

According to the configuration described above, it is possible to perform the correction with the intensity according to the deviation amount for each pixel. The brightness correction is an example, and it suffices when there is a configuration in which the correction amount becomes larger in the case where the deviation amount is large than in the case where the deviation amount is small, that is, a configuration in which the deformation ratio changes continuously or step by step according to the deviation amount. The sharpness correction is an example, and it suffices when there is a configuration in which the correction amount becomes larger in the case where the deviation amount is large than in the case where the deviation amount is small, that is, a configuration in which the deformation ratio changes continuously or step by step according to the deviation amount.

In the embodiment, the overlap region discretely exists in the main scanning direction. Accordingly, in the embodiment in which the correction section 13 calculates the correction amount of each pixel existing between the overlap regions from the deviation amount for each overlap region and performs the brightness correction and the sharpness correction for each pixel, the same type of correction is performed on the image in the overlap region and the image in a region continuing to the overlap region. That is, the overlap region discretely exists on the document, but there is a high possibility that the displacement of the document continuously occurs exceeding the overlap region. Accordingly, there is a high possibility that the deterioration of the image quality occurring in the overlap region continuously occurs even in the region continuing to the overlap region. According to the embodiment in which the same type of the correction is performed on the image in the overlap region and the image in the region continuing to the overlap region, it is possible to effectively eliminate or reduce the deterioration of the image quality which is occurred continuously.

(7) Example

Figure 23:
FIG. 23 is a diagram showing an example of scan data in a case where the deformation and the mix are not performed.
Figure 24:
FIG. 24 is a diagram showing an example of the scan data in a case where the mix is performed.
Figure 25:
FIG. 25 is a diagram showing an example of the scan data in a case where the deformation and the mix are performed.

FIGS. 23 to 25 are diagrams showing examples of scan data obtained by reading a document displaced from the reference reading position. The deviation amount is 4 in the examples. The figures are examples of the scan data of the document in which each character of S, N, II (roman numeral 2), III (roman numeral 3), 画, and 像 is arranged in the sub scanning direction (画像 is a character string that means image in Japanese). FIG. 23 is an example of the scan data in a case of not performing the deformation processing and the mixing processing of the image, FIG. 24 is an example of the scan data in a case of not performing the deformation processing and performing the mixing processing of the image, and FIG. 25 is an example of the scan data in a case of performing the deformation processing and the mixing processing of the image.

When the document is displaced from the reference reading position, the document is in a state where the reading result is reduced as compared with the case where the document exists at the reference reading position, and the straight line which is non-parallel and non-perpendicular in the main scanning direction on the overlap region may be separated as shown in FIG. 11. For example, as an oblique line of character N shown in FIG. 23, a straight line which is required to originally be one oblique line is viewed as two separated lines. When the displacement amount of the document from the reference reading position is large, such separation is not eliminated even when the mixing processing is performed. Therefore, the two straight lines are not mixed as shown in FIG. 24.

However, when the image is deformed in the overlap region, although the straight line which is non-parallel and non-perpendicular in the main scanning direction on the overlap region becomes the non-straight line, the lines are combined as an image bound into one. For example, the oblique line of character N shown in FIG. 25 is a single line. The oblique line of character N shows the image having the both end portions Pe and the center portion Pc having the angle closer to the main scanning direction than angles of the both end portions shown in FIG. 13. The change in which the straight line becomes the non-straight line is observed generally in the straight line which is non-parallel and non-perpendicular in the main scanning direction on the overlap region. Accordingly, for example, in a case where the scanner 1 reads a straight line that passes from the outside of the overlap region to the outside the overlap region through the overlap region, the straight line in the overlap region has an angle closer to the main scanning direction than the straight line outside the overlap region. For this reason, it can be said that the embodiment includes the configuration of combining the straight line which is non-parallel and non-perpendicular in the main scanning direction on the overlap region as the image of the non-straight line, and further, is the configuration in which the image of the non-straight line in the case of reading the straight line includes the both end portions and the center portion having the angle closer to the main scanning direction than angles of the both end portions.

Further, in the embodiment, it is possible to perform the combining so as to obtain the same reading result even when the displacement amount from the reference reading position of the document is different. For example, in the case where the straight line in the overlap region is read, a state is assumed that two elements that detect the straight line on the overlap region using the line sensor are deviated by one or more elements from each other due to the different displacement amounts from the reference reading position of the document.

That is, when the same document is read twice in the same position where the document is placed on the document platen, the same straight line is read by the same element on the line sensor in each case. However, even when the position where the document is placed on the document platen is the same, when the reading is performed twice in a state where a distance between the document and the reference reading position is different, the same straight line may be read by different elements on the line sensor. The situation can be said that the reading is performed in a first case where the document including the straight line exists at a position distant from a first distance from the reference reading position and in a second case where the document including the straight line exists at a position distant from a second distance from the reference reading position, and the straight line is read by elements deviated by one or more elements on the line sensor.

As described above, in the case where the same position of the document is read in the state where the distance from the reference reading position is different, since the reading is performed in a state where a relative distance between the image at the same position and the binding position is different, the deterioration of the image quality such as the separation of the straight line may occur. Accordingly, when there is an attempt to make the separated straight line to one only by the mixing processing without performing the deformation of the image, a width of the straight line increases. However, as in the embodiment, when the combining section 11 combines the images in the overlap region by deforming in the main scanning direction, since the image can be modified so as to be seen as a single line, there is no need to change the width of the line by the mixing or the like, and it is possible to perform the combining without the deterioration of the image quality such as increase or decrease of the number of lines. Accordingly, it is possible to improve the image quality of the scan data obtained by combining the outputs of the plurality of line sensors 21a.

Figure 26:
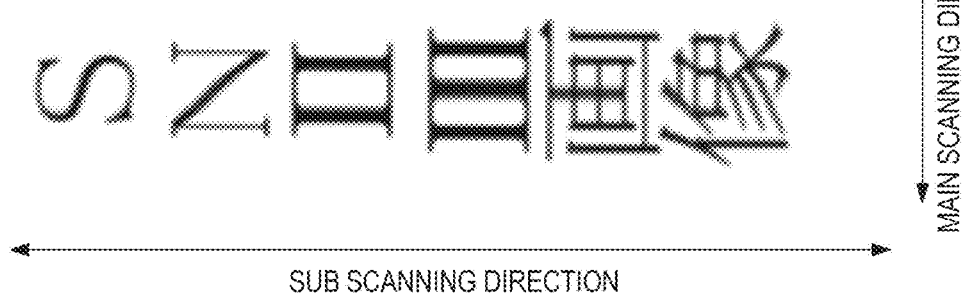
FIG. 26 is a diagram showing an example of the scan data in the case where the deformation and the mix are performed.

FIGS. 25 and 26 are examples of the first case and the second case, and the deviation amounts are 4 and 3, respectively. For this reason, the reading of the straight line may be performed by the elements deviated by one or more elements on the line sensor. In the examples, for example, the oblique lines or the like of the characters "S" and "N" may be read by the elements deviated by one or more elements on the same line sensor. In the reading results, the oblique lines or the like of the characters "S" and "N" are combined as an image having the same width. For example, whether the width is the same may be evaluated by the number of pixels or the like in a specific direction (main scanning direction and sub scanning direction). It is possible to employ a configuration in which a pixel is regarded as the pixel configuring a character in a case where a gradation value of each pixel is equal to or larger than a predetermined threshold value or the like. There may be a configuration that when it is determined whether the width is the same, it is regarded as having the same width in a case where a difference in the width is equal to or less than a predetermined value.

Further, it can be said the combining section 11 is configured to combine the straight line as an image of a single line in a case where the straight line which is non-parallel and non-perpendicular in the main scanning direction on the overlap region is read as an image having a width of two pixels in the main scanning direction by relatively changing the reading results of the first region and the second region by at least four pixels in the main scanning direction.

That is, the state (state where deviation amount is 4) where the degree of relative deviation in the main scanning direction between the first read image and the second read image that read the same position in the overlap region is 4 pixels is an extremely large deviation in the reading of the straight line having the width of two pixels in the main scanning direction. For example, in the examples in FIGS. 23, 24, and 25, the oblique lines of the characters "S" and "N" correspond to the lines having the width of two pixels in the main scanning direction (width becomes 2 after binarization by threshold value). In the case of performing the reading of the straight line in the state, when the combining is performed without performing the deformation and mixing in the embodiment, for example, the straight lines obviously become discontinuous as shown in FIG. 23. When such large deviation occurs, the lines often do not become one even in the case of performing the mixing processing (shadowy image may appear) as shown in FIG. 24.

However, when the deformation in the embodiment is performed, even when a large deviation occurs from the line width, it can be combined as a single line having the width of two pixels in the main scanning direction as shown in FIG. 25. As a result, it is possible to perform the combining without the deterioration of the image quality such as the discontinuity of the straight line. Accordingly, it is possible to improve the image quality of the scan data obtained by combining the outputs of the plurality of line sensors. The image of the single line which is a combining result of the straight line may be an image which is not discontinuous due to the separation of the line or the like and is recognized as a single line or an image of non-straight line such as a polygonal line or a curved line.

Further, the combining section 11 combines the straight line as an image of a single line in a case where the straight line which is perpendicular in the main scanning direction on the overlap region is read as an image having a width of two pixels in the main scanning direction by relatively changing the reading results of the first region and the second region by at least four pixels in the main scanning direction.

That is, the state (state where deviation amount is 4) where the degree of relative deviation in the main scanning direction between the first read image and the second read image that read the same position in the overlap region is 4 pixels is an extremely large deviation in the reading of the straight line having the width of two pixels in the main scanning direction. For example, in the examples in FIGS. 23, 24, and 25, the middle vertical lines (line parallel to sub scanning direction) in the characters "III (roman numeral 3)" and "画" correspond to the lines having the width of two pixels perpendicular to the main scanning direction (width becomes 2 after binarization by threshold value). In the case of performing the reading of the straight line in the state, when the combining is performed without performing the deformation and mixing in the embodiment, for example, the straight line is viewed obviously as two separated lines as shown in FIG. 23. When such large deviation occurs, the lines often remain separated even in the case of performing the mixing processing as shown in FIG. 24.

However, when the deformation in the embodiment is performed, even when a large deviation occurs from the line width, it can be combined as a single line having the width of two pixels in the main scanning direction as shown in FIG. 25. As a result, it is possible to perform the combining without the deterioration of the image quality such as the separation of the straight line. Accordingly, it is possible to improve the image quality of the scan data obtained by combining the outputs of the plurality of line sensors. The image of the single line which is a combining result of the straight line may be an image which is not discontinuous due to the separation of the line or the like and is recognized as a single line or an image of non-straight line such as a polygonal line or a curved line.

(8) Another Embodiment

The embodiment described above is an example for performing the invention, and various other embodiments can be employed. For example, the scanner according to one embodiment of the invention may be included in a composite machine or the like which is an electronic component used for a purpose other than the reading.

Further, as in the embodiment, the method of generating the scan data by combining the first scan data output from the first line sensor 21a1 and the second scan data output from the second line sensor 21a2 can be realized as an invention of a program, an invention of a method, and an invention of a generation method of scan data.

Further, the scan data generated by performing the reading may be output to a storage medium such as a USB memory mounted on the apparatus to store the scan data, may be output to a print mechanism to print (that is, copy) the scan data, or may be output to a monitor to display in addition to output to the computer 90. Further, the processing in at least a part of the combining section 11, the acquisition section 12, and the correction section 13 may be performed by a driver program or an application program of the computer 90, and final scan data may be generated by the combining. In the case, it is possible to regard the computer 90 as a part of the scanner.

The first region, the second region, and the overlap region described above are regions on the document and are defined by a relationship between the line sensor 21a included in the scanner 1 and the document set to the scanner 1. That is, in the scanner 1, a position and an optical system (for example, optical section such as lens and light source) of the line sensor 21a are designed so as to read the same position by the plurality of line sensors 21a in an overlapped manner. In such configuration, when the document is read by the first line sensor 21a1 and the second line sensor 21a2, a region where the document exists is read by both the first line sensor 21a1 and the second line sensor 21a2. The region is the overlap region. The scanner 1 may include at least two line sensors 21a, and the number of the line sensors is not limited as long as the scanner includes the plurality of line sensors. Accordingly, the number of the line sensors may be three or more. In the case, there are a plurality of the first region and the second region.

The scanner 1 may scan the document in various modes, and various configurations can be employed such as a configuration of scanning the document while transporting with auto document feeder (ADF) or a configuration of scanning while moving an optical unit of the line sensor 21a or the like with respect to the document placed on the document platen. The scanner 1 is not limited to the one that performs the scanning by switching between a monochrome line sensor and light sources of a plurality of colors. The scanner may be a monochrome scanner that performs the scanning by the monochrome line sensor and a light source of single color or may be a color scanner that includes a plurality of sensor arrays in which each of the plurality of line sensors 21a corresponds to each of the plurality of colors and performs the scanning using a white light source.

In the scanner including the document platen, a displacement direction of the document from the reference reading position is one direction of a floating direction. However, in the scanner including the configuration of transporting the document with ADF, there is a case where the displacement direction of the document from the reference reading position is defined by two directions (floating direction or sinking direction). In the case, the optical path length reaching to the document and the line sensor from the light source may be varied in positive and negative with respect to the reference optical path length. Accordingly, in the case where the displacement of the document occurs, a case where the image is read in a reduced state and a case where the image is read in an enlarged state may occur.

In the case where the image is enlarged, the difference total value can be minimized by moving the first read image and the second read image away from each other in step S220 described above. Accordingly, in the case where the displacement of the document is two directions, in the loop processing in steps S220 to S230, the difference total value is acquired by trying to move the first read image and the second read image toward and away from each other. In step S235, the deviation amount is acquired by setting a deviation amount acquired by any one of such moving directions as positive and a deviation amount acquired by moving in the opposite direction as negative.

In the embodiment described above, the non-straight line in which the straight lines are read and combined may be a line in which the orientation of a continuous line is not in one direction. Accordingly, the non-linear line may be a figure having a bending point at least one place of the continuous line, may be a curved line, or may be a combination thereof. That is, in the embodiment described above, even in the state where the document is displaced from the reference reading position, since the straight line existing in the overlap region is deformed, an angle of the line may be an angle different from the straight line on the document. However, when the change in the angle is permitted, it is possible to read the line as a single line without separating lines.

The straight line existing in the overlap region is a straight line on the document and may be a figure which is required to be read as a straight line unless the position of the document is displaced. Accordingly, even when the document itself is scanned in a bent state such as the bound portion of the book, when a figure that becomes a straight line when the document is flat is inclined in the main scanning direction and the sub scanning direction, the figure may correspond to the straight line which is non-parallel and non-perpendicular in the main scanning direction on the overlap region.

Further, in a configuration in which the straight line is combined as the non-straight line having the center portion and the both end portions, the center portion may have an angle closer to the main scanning direction than the both end portions (state where an intersecting angle of an acute angle with respect to the main scanning direction is smaller in the center portion than in the both end portions). That is, in the case where the enlargement of the image is performed in the main scanning direction by the combining section 11, since the line which is non-parallel and non-perpendicular in the main scanning direction is deformed so as to have the angle close to the main scanning direction, the center portion may be a line having an angle reflecting the deformation. The both end portions are lines located at both ends of the line having the angle and portions which are not subjected to the deformation such as the enlargement or are less affected by the deformation. Accordingly, the center portion is mainly the reading result of the figure on the overlap region, and the both end portions are mainly the reading result of the figure outside the overlap region (or figure in a region which is not deformed).

The reference reading position may be an appropriate position of the document, and various determination methods can be employed according to the mode of the scanner 1. For example, in the case of the scanner 1 that scans the document while transporting with auto document feeder (ADF), for example, a specific position in the document transportation path is the reference reading position, and in the case of the scanner 1 that scans the document placed on the document platen, for example, a contacting position between the document platen and the document in the state where the document is placed on the document platen is the reference reading position.

The deviation amount may be acquired based on the matching degree between the first read image and the second read image, and the matching degree may be defined for specifying a deviation degree between the first read image and the second read image that read the same position from an original position. Accordingly, the matching degree may be verified for a range where the reading result at the same position can be included in the first read image and the second read image. For example, a range of a pixel that reads the overlap region is determined in advance, the first read image and the second read image are moved in the range, and the matching degree may be verified. Since the first read image and the second read image are similar, the matching degree may be defined so as to be a high matching degree.

Further, the shading of the image which is analyzed when specifying the deviation amount may be a value reflecting a detection value of the line sensor, and various configurations can be employed such as an output value from a line sensor element, a value after image processing such as gamma correction or the like, a gradation value for each color component, or a value such as the brightness.

Further, in the embodiment described above, the deformation ratio is changed linearly according to the deviation amount, but there may be a configuration in which the deformation ratio is larger in the case where the deviation amount is large than in the case where the deviation amount is small. That is, there may be a configuration in which the deformation ratio is changed continuously or step by step according to the deviation amount.

Further, in the embodiment described above, the correction section 13 executes the brightness correction and the sharpness correction based on the deviation amount (relative deviation amount of first read image and second read image in the main scanning direction), but other configurations may be employed. For example, there may be a configuration in which the acquisition section 12 acquires a degree of the displacement of the document from the reference reading position, and the correction section 13 corrects the image after the combining based on the degree of the displacement.

That is, when the degree of the displacement of the document from the reference reading position is acquired directly, it is possible to perform the correction for eliminating or reducing the deterioration of the image quality caused by the displacement of the document from the reference reading position. For example, it is possible to employ a configuration in which the deviation is measured by a sensor (for example, distance sensor) included in the scanner 1. The degree of the displacement may be acquired as the displacement amount from the reference reading position, and, for example, another configuration in which the degree of the displacement is acquired relatively in two states where displacement states are different or the like may be employed.

Further, as the correction method by the correction section 13, various methods other than the method described above can be employed. For example, a configuration may be employed in which the correction section 13 corrects the image inside the correction target region based on the image outside the correction target region. That is, the deterioration of the image quality such as decrease in the brightness and decrease in the sharpness caused by the displacement of the document can occur in the correction target region, but in the outside thereof, it is estimated that the deterioration of the image quality caused by the displacement of the document does not occur. When the image outside the correction target region is analyzed, it is possible to specify the correction for eliminating or reducing the deterioration of the image quality in the correction target region. For example, it is possible to eliminate or reduce the deterioration of the image quality by correcting the image in the correction target region so as to approach the brightness and the sharpness outside the correction target region.

For example, the configuration is realized as a configuration of correcting the inside of the correction target region based on a background color around the inside of the correction target region. More specifically, a coefficient Kmax is defined in advance as a coefficient for correcting the maximum decrease in the brightness by the deviation amount 1. The correction section 13 acquires a temporary density value of each pixel by multiplying the density value of each pixel by a correction coefficient 1/(1−Kmax×deviation amount of each pixel). In a case where the temporary density value is brighter than the background color of the document, the pixel color is set to the background color, and in a case where the temporary density value is darker than the background color of the document, the pixel color is regarded as the temporary density value.

What is claimed is:
1. A scanner comprising:
a first sensor array and a second sensor array having read regions which are overlapped partially; and
a processor constituting
   a combining section configured to combine a first read image read by the first sensor array and a second read image read by the second sensor array,
   an acquisition section configured to acquire a degree of relative deviation between the first read image and the second read image in a main scanning direction in a region read by the first sensor array and the second sensor array in an overlapped manner, and
   a correction section configured to correct an image based on the degree of the relative deviation acquired by the acquisition section,
wherein the correction section outputs a combined image, whose brightness is made brighter and/or whose sharp- ness is made higher, in a case where the degree is large than in a case where the degree is small.

2. The scanner according to claim 1,
wherein the correction section determines a correction target region based on a distribution of the degree.

3. The scanner according to claim 2,
wherein a plurality of overlap regions read by the first sensor array and the second sensor array in an overlapped manner exist in the main scanning direction, and
wherein the distribution is a distribution of the degree in the plurality of overlap regions.

4. The scanner according to claim 3,
wherein the correction section corrects an image inside the correction target region based on an image outside the correction target region.

5. The scanner according to claim 4,
wherein the correction section performs the same type of correction with respect to an image in an overlap region read by the first sensor array and the second sensor array in an overlapped manner, and an image in a region continuous to the overlap region.

6. A non-transitory, non-volatile storage medium that stores a scan program, the program causing
a computer that controls a scanner including a first sensor array and a second sensor array having read regions which are overlapped partially to function as:
a combining section configured to combine a first read image read by the first sensor array and a second read image read by the second sensor array;
an acquisition section configured to acquire a degree of relative deviation between the first read image and the second read image in a main scanning direction in a region read by the first sensor array and the second sensor array in an overlapped manner; and
a correction section configured to correct an image based on the degree of the relative deviation acquired by the acquisition section,
wherein the correction section outputs a combined image, whose brightness is made brighter and/or whose sharpness is made higher, in a case where the degree is large than in a case where the degree is small.

7. A method of producing scan data using a scanner including a first sensor array and a second sensor array having read regions which are overlapped partially, the method comprising:
combining a first read image read by the first sensor array and a second read image read by the second sensor array;
acquiring a degree of relative deviation between the first read image and the second read image in a main scanning direction in a region read by the first sensor array and the second sensor array in an overlapped manner; and
correcting an image based on the degree of the relative deviation acquired by the acquisition section by outputting a combined image, whose brightness is made brighter and/or whose sharpness is made higher, in a case where the degree is large than in a case where the degree is small.

* * * * *